(12) United States Patent
Lo et al.

(10) Patent No.: US 9,576,399 B2
(45) Date of Patent: Feb. 21, 2017

(54) APPARATUSES, METHODS AND SYSTEMS COUPLING VISUAL ACCOMMODATION AND VISUAL CONVERGENCE TO THE SAME PLANE AT ANY DEPTH OF AN OBJECT OF INTEREST

(71) Applicant: Meta Company, Redwood City, CA (US)

(72) Inventors: Raymond Chun Hing Lo, Richmond Hill (CA); Stefano Baldassi, Menlo Park, CA (US)

(73) Assignee: Meta Company, San Mateo, CA (US)

( * ) Notice: Subject to any disclaimer, the term of this patent is extended or adjusted under 35 U.S.C. 154(b) by 0 days.

(21) Appl. No.: 14/757,464

(22) Filed: Dec. 23, 2015

(65) Prior Publication Data

US 2016/0260258 A1     Sep. 8, 2016

Related U.S. Application Data

(60) Provisional application No. 62/096,521, filed on Dec. 23, 2014.

(51) Int. Cl.

| | |
|---|---|
| G06T 15/50 | (2011.01) |
| G06T 19/00 | (2011.01) |
| G06T 7/00 | (2006.01) |
| G06T 15/00 | (2011.01) |
| G06T 15/20 | (2011.01) |
| G06F 3/01 | (2006.01) |

(52) U.S. Cl.
CPC ............. *G06T 19/006* (2013.01); *G06F 3/013* (2013.01); *G06T 7/00* (2013.01); *G06T 15/00* (2013.01); *G06T 15/20* (2013.01)

(58) Field of Classification Search
None
See application file for complete search history.

(56) References Cited

U.S. PATENT DOCUMENTS

| | | | |
|---|---|---|---|
| 6,100,862 A | 8/2000 | Sullivan | |
| 8,493,379 B2 * | 7/2013 | Karman | ............. H04N 13/0018 345/419 |
| 2011/0241977 A1 | 10/2011 | Powell | |
| 2012/0113097 A1 | 5/2012 | Nam et al. | |
| 2014/0285429 A1 * | 9/2014 | Simmons | ............. G02B 27/225 345/156 |
| 2015/0085086 A1 * | 3/2015 | Marchand | ............... G06T 15/20 348/51 |
| 2015/0235472 A1 * | 8/2015 | Schowengerdt | ...... G06T 19/006 345/633 |
| 2016/0147301 A1 * | 5/2016 | Iwasaki | ................... G06F 3/013 345/157 |

(Continued)

OTHER PUBLICATIONS

International Search Report, PCT/US15/00277, May 19, 2016, 4 Pages.

(Continued)

*Primary Examiner* — Peter Hoang
(74) *Attorney, Agent, or Firm* — Andrew Bodendorf

(57) ABSTRACT

Aspects of the disclosed apparatuses, methods and systems provide three dimensional gradient and dynamic light fields for display in 3D technologies, in particular 3D augmented reality (AR) devices, by coupling visual accommodation and visual convergence to the same plane at any depth of an object of interest in real time.

9 Claims, 22 Drawing Sheets

(56) References Cited

U.S. PATENT DOCUMENTS

2016/0219258 A1\* 7/2016 Woodgate .......... H04N 13/0022
2016/0286204 A1\* 9/2016 Grata ................... H04N 13/044

OTHER PUBLICATIONS

Written Opinion, PCT/US15/00277, May 19, 2016, 6 Pages.
Fu-Chung Hung et al. "The light field stereoscope: immersive computer graphics via factored near-eye light field displays with focus cues" vol. 34, Issue 4, Aug. 2015.

\* cited by examiner

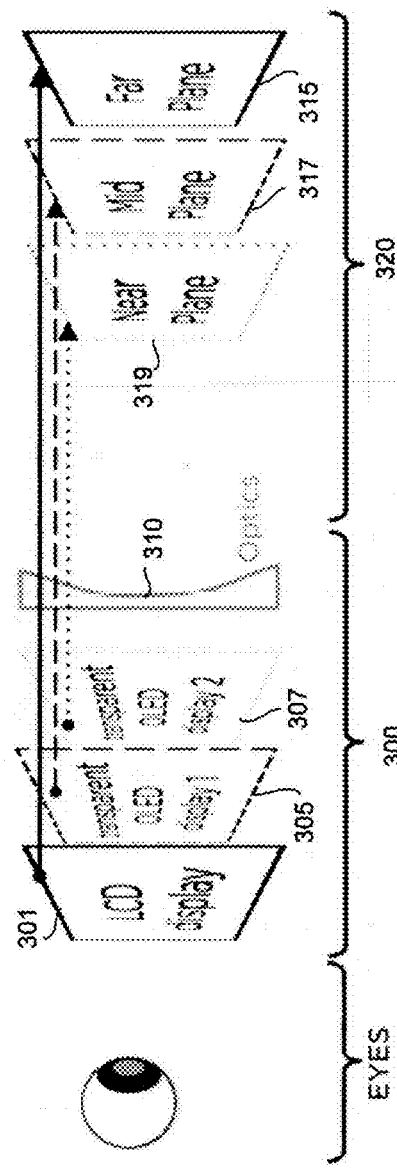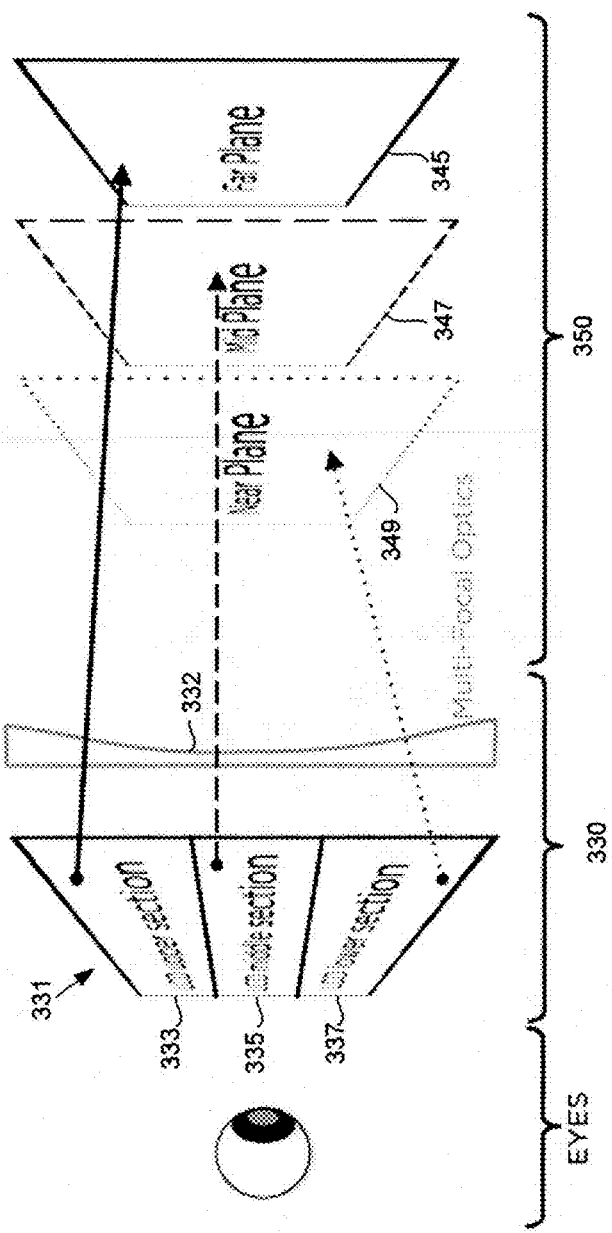
FIG. 3A
FIG. 3B

APPARATUSES, METHODS AND SYSTEMS COUPLING VISUAL ACCOMMODATION AND VISUAL CONVERGENCE TO THE SAME PLANE AT ANY DEPTH OF AN OBJECT OF INTEREST

CROSS-REFERENCE TO RELATED APPLICATIONS

This application claims the benefit under 35 U.S.C. §119 (e) of U.S. Provisional Application No. 62/096,521, titled "APPARATUSES, METHODS AND SYSTEMS COUPLING VISUAL ACCOMMODATION AND VISUAL CONVERGENCE TO THE SAME PLANE AT ANY DEPTH OF AN OBJECT OF INTEREST" filed on Dec. 23, 2014 in the U.S. Patent and Trademark Office, which is herein expressly incorporated by reference in its entirety for all purposes.

BACKGROUND

There are many types of vision systems that provide virtual or augmented reality displays. In particular, wearable technology such as head mounted displays (HMD) are becoming more popular. However, problems may exist with wearing or using such visual systems for some users, even if only worn or used for short periods of time.

SUMMARY

In one general aspect, the process, systems, components, and techniques described herein, enable the creation of light fields (e.g., gradient and dynamic light fields) to generate three dimensional (3D) imagery for a user of the vision system while maintaining and/or optimizing the functionality of the virtual or augmented reality display and the comfort of the user viewing the imagery provided by the light fields.

In one general aspect, a vision system includes: a first display; a second display; and an optical element. The optical element is arranged at a first distance from the first display and at a second distance from the second display to project light emitted from the first display in a first focal plane and to project light emitted from the second display in a second focal plane. A processing device is configured to control the relative intensity (RI) of one or more pixels of the first display and the second display to generate a perceived three dimensional light field.

The s first focal plane may be a far plane (FP) of focus to a viewer of the system and the second focal plane may be a near plane (NP) of focus to a viewer of the system.

RI of the system may be expressed as: $RI=(INP-IFP)/(INP+IFP)$ where RI is the relative intensity calculated at each pixel of an image and normalized, INP is the intensity of the image provided in the NP, IFP is the intensity of the image provided in the FP.

The first display may be a liquid crystal display and the second display may be a transparent organic light emitting diode display and the optical element may have a single focus.

The system also may include additional displays. For example, a third display may be arranged at a third distance from the optical element that is closer than the first display and farther than the second display, where the third display is arranged to project an image in a mid-plane of focus of the viewer of the system.

In another general aspect, a vision system includes: a display including at least a first portion and a second portion; a multifocal optical element including a first focus arranged to project light emitted from the first portion of the display in a first focal plane and a second focus arranged to project light emitted from the second portion of the display in a second focal plane; and a processing device configured to control the relative intensity (RI) of one or more pixels of the first portion of the display and the second portion of the display to generate a perceptual three dimensional light field by.

The first focal plane of the system may be a far plane (FP) of focus to a viewer of the system and the second focal plane may be a near plane (NP) of focus to a viewer of the system.

RI of the system may be expressed as: $RI=(INP-IFP)/(INP+IFP)$ where RI is the relative intensity calculated at each pixel of an image and normalized, INP is the intensity of the image provided in the NP, IFP is the intensity of the image provided in the FP.

The display may further include a third portion and the multifocal optical element may include a third focus arranged to project an image from the third portion in a mid-plane of focus of the viewer of the system.

In another general aspect, a method of generating a gradient light field for a vision system, the method includes: receiving image data by at least one component of the vision system; determining a perceived depth within the gradient light field formed by at least two focal planes by the component for a pixel of the image data to be presented to the viewer; determining an relative intensity (RI) the pixel of the image data in each focal plane, the RI corresponding to the determined perceived depth of the pixel in the light field; and controlling a pixel of a corresponding light source or portion of a light source to illuminate at an intensity corresponding to the determined RI.

The method may determine RI as expressed by: $RI=(INP-IFP)/(INP+IFP)$ where RI is the relative intensity calculated at each pixel of an image and normalized, INP is the intensity of the image provided in the NP, IFP is the intensity of the image provided in the FP.

In another general aspect, a vision system comprising: an eye tracking device configured to determine a position of the eyes of a viewer of the system; a multifocal optical element; and a processing device configured to determine the convergence point in a three dimensional space of the viewer of the vision system, to adjust a focal plane of the vision system based on the determined convergence point, and to render depth dependent disparity and blur by the vision system for a displayed image based on the adjusted focal plane.

In another general aspect, method of generating a perceptual dynamic light field to a viewer of a vision system includes determining the convergence point in three dimensional space of the viewer of the vision system; adjusting the focal plane of the vision system based on the determined convergence point; and rendering depth dependent disparity and blur by the vision system for a displayed image based on the adjusted focal plane.

The method also may include directing light from a source at the eyes of the viewer; sensing the reflectance of the light source from the eyes; and determining the eye position of each eye of the viewer, wherein the convergence point is determined based on the determined eye positions of the viewer.

The details of various embodiments are set forth in the accompanying drawings and the description below. Other features and advantages will be apparent from the following description, the drawings, and the claims.

BRIEF DESCRIPTION OF DRAWINGS

The following description illustrates aspects of embodiments of the disclosed apparatuses, methods and systems in more detail, by way of examples, which are intended to be non-limiting and illustrative with reference to the accompanying drawings, in which:

FIGS. 3A and 3B show examples of a vision system using three focal planes.

DETAILED DESCRIPTION

Figure 1A:
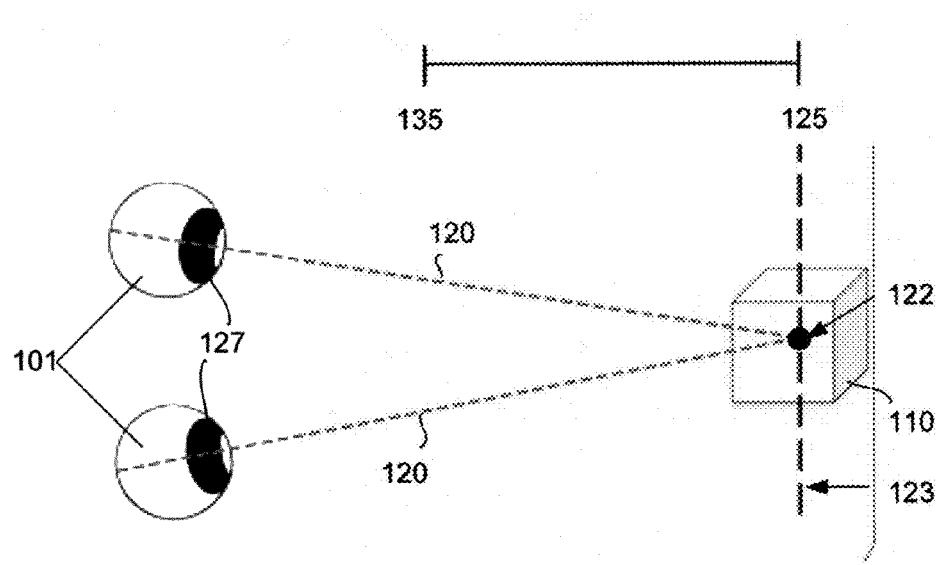
FIGS. 1A and 1B illustrate an example of the coupling of visual accommodation and visual convergence in a vision process.

The following detailed description is merely exemplary in nature and is not intended to limit the described embodiments (examples, options, etc.), or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the preceding brief summary or the following detailed description. It is also to be understood that the specific devices and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims which expressly states otherwise. It is understood that "at least one" is equivalent to "a".

The aspects (examples, alterations, modifications, options, variations, embodiments and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of some embodiments have not been discussed herein. That alternate embodiments may not have been presented for a specific portion of the invention or that further alternate embodiments which are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

Vision Processes:

In one general aspect, human binocular or stereo vision incorporates at least two tightly coupled physiological mechanisms. For example, one mechanism may be labeled as visual accommodation (VA). VA may refer to the dynamic change of the curvature of the crystalline lens of the eye that adjusts focus on a plane of depth (e.g., a focal plane) corresponding to, for example, one or more objects of interest (OOI). Another mechanism may be labeled as visual convergence (VC), which is sometimes referred to as vergence. VC may refer to the rotation of each eye that allows the line of sight of each eye to converge at a point in space, for example, corresponding to OOIs located at various distances. FIGS. 1A, 1B, 1C, and 1D help illustrate these mechanisms.

Figure 1B:
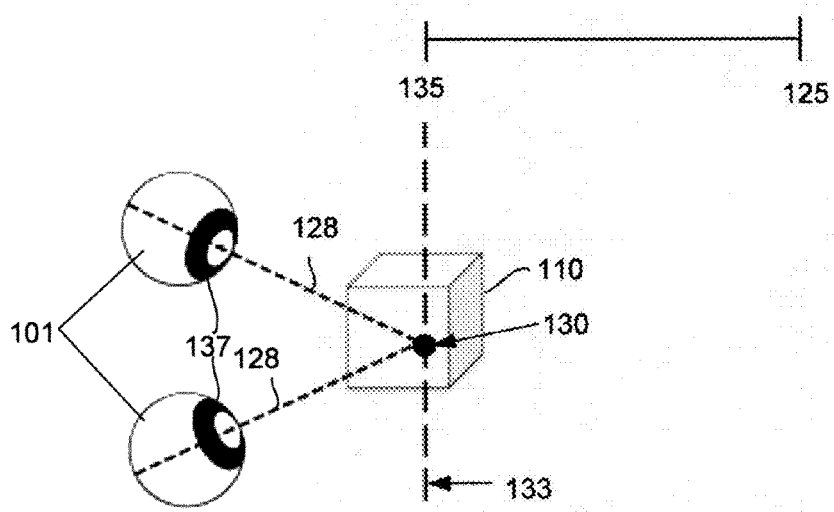

For example, as shown in FIGS. 1A and 1B, a pair of eyes 101 observe an OOI 110 at a near 135 and a far depth 125. As shown in FIGS. 1A, 1B, 1C, and 1D the crystalline lens of the eye changes curvature as a function of the depth. The lines of sight 120 of each eye converge at a convergence point (CP) 122 at the OOI 110 in an accommodation plane (AP) 123 at a far depth 125 corresponding to a first curvature 127 of the crystalline lens of the eyes. As the OOI 110 is moved forward (as shown in FIG. 1B), the eyes rotate inward such that the new lines of sight 128 converge at a CP 130 at the OOI 110 in an AP 133 at a near depth 135 corresponding to a second curvature 137 of the crystalline lens of the eyes. As shown in FIGS. 1A and 1B, the AP and CP are located in the same plane (e.g., 123 in FIG. 1A and 133 in FIG. 1B). Thus, FIGS. 1A and 1B illustrate one example of ordinary human vision where VA and VC are coupled to far OOIs (FIG. 1A) and near OOIs (FIG. 1B).

Figure 1C:
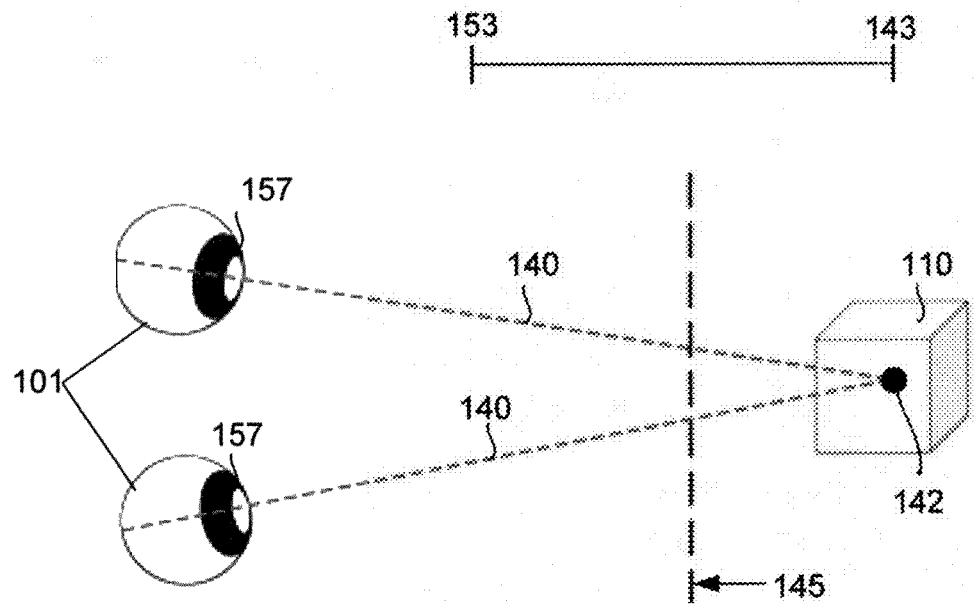
FIGS. 1C and 1D illustrate an example of the decoupling of visual accommodation and visual convergence in a vision process.
Figure 1D:
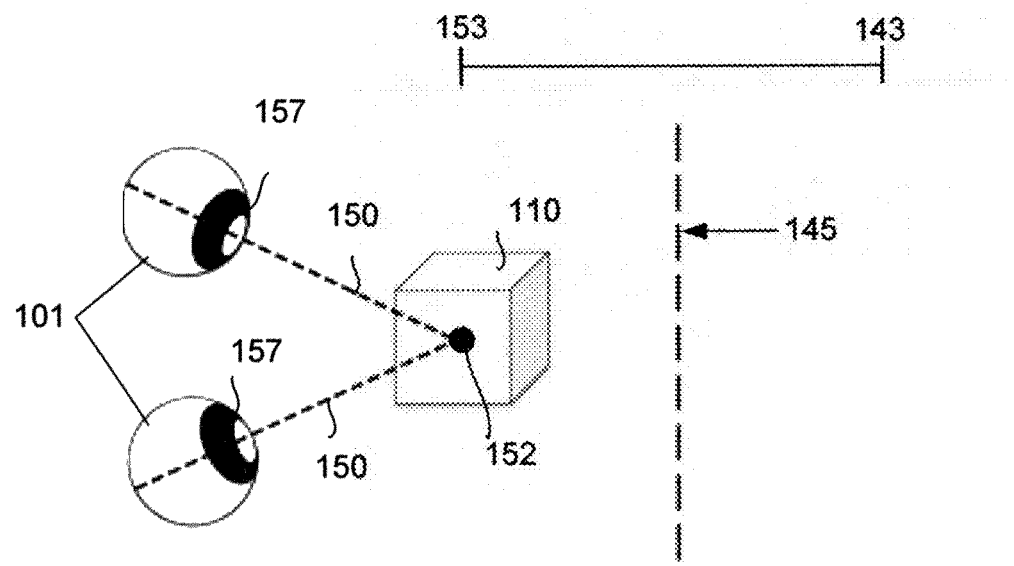

FIGS. 1C and 1D illustrate one example of the decoupling of VA and VC. For example, as shown in FIG. 1C, a pair of eyes 101 observe an OOI 110. However, the lines of sight 140 of each eye converge at a CP 142 at the OOI 110 at a depth 143 that is farther than the AP 145. FIG. 1D shows an example of the lines of sight 150 of eyes 101 that converge at a CP 152 at the OOI 110 at a depth 153 that is closer than the AP 145. In the examples shown in FIGS. 1C and 1D, the curvature 157 of the crystalline lens of the eyes (which may adjust to focus at OOI's of different depths), is fixed onto a plane 145. As a result, the focal plane 145 is disjoined from the apparent depth of the OOI 110, whether near or far, and only the CP dynamically tracks the OOI 110.

Given that a diopter is a unit=1/meters, when the distance between the CP and the AP is larger than a distance, such as, for example, about ⅓ diopter, individuals typically experience eye-strain and/or other symptoms of visual discomfort. Therefore, when the CP is dynamically set by a visual system to ensure visual fusion of the images of the object seen by each eye; poor convergence results, for example, in double vision. In addition, when a visual system provides a single, invariant AP, for example, where the image is projected and CP is varied dynamically, eye strain and associated discomfort may also occur.

Nevertheless, as noted herein, the human perceptual system has the ability to combine various sensory cues in an efficient manner in order to perceive 'physically plausible' digital objects in space. For example, the human perceptual system has the ability to integrate, among other things, sensory cues, such as one or more of luminance, depth, shape information, to form or perceive a coherent, visual object. As a result, the properties of the human perception may be exploited through visual systems, as described herein, may employ hardware and/or software architectures to form a digital image that can be located or perceived in space by the user of the vision system by virtue of the principles of the depth sensitive modules of the human brain.
Gradient Light Field:

According to one exemplary embodiment of the systems and the techniques described herein, a gradient light field is provided by a vision system to, for example, generate 3D imagery for a user of the vision system while maintaining and/or optimizing comfort of the user viewing the imagery. The vision system may be implemented in any system including at least one processing device that provides digital image graphics processing, at least one light source controlled by the processing device, and one or more corresponding visual optical elements to project the image. The various components and configurations of the vision system are described in more detail below. In one example, the vision system may be incorporated in a head mounted display system (HMD) and the like, such as, for example, the system described in U.S. patent application Ser. No. 14/147,199, titled "Extramissive Spatial Imaging Digital Eye Glass Apparatuses, Methods and Systems for Virtual or Augmediated Vision, Manipulation, Creation, or Interaction with Objects, Materials, or Other Entities," filed Jan. 3, 2014, or the system described in U.S. patent application Ser. No. 14/945,372 titled "Wide Field of View Head Mounted Display Apparatuses, Methods and Systems" filed Nov. 18, 2015, both of which are herein incorporated by reference in their entirety for all purposes.

In one implementation, the vision system projects in the same planar (i.e., two dimensional ("2D")) location of at least two distinct focal planes—for example, a near plane (NP) and a far plane (FP) that are separated by a depth delta $\Delta$ expressed in units of diopters. If an object in the two projected images is the same or substantially similar, the human visual system integrates the objects of the two projected images into a single object whose perceived depth depends on the relative intensity of the pixels forming the object in each projected image.

In one implementation of the vision system, the relative intensity of the pixels may be given as:

$$RI=(INP-IFP)/(INP+IFP) \qquad [1]$$

where RI is the relative intensity which may be calculated at each pixel of an image and normalized, INP is the intensity of the image provided in the NP, and IFP is the intensity of the image provided in the FP.

Figure 2A:
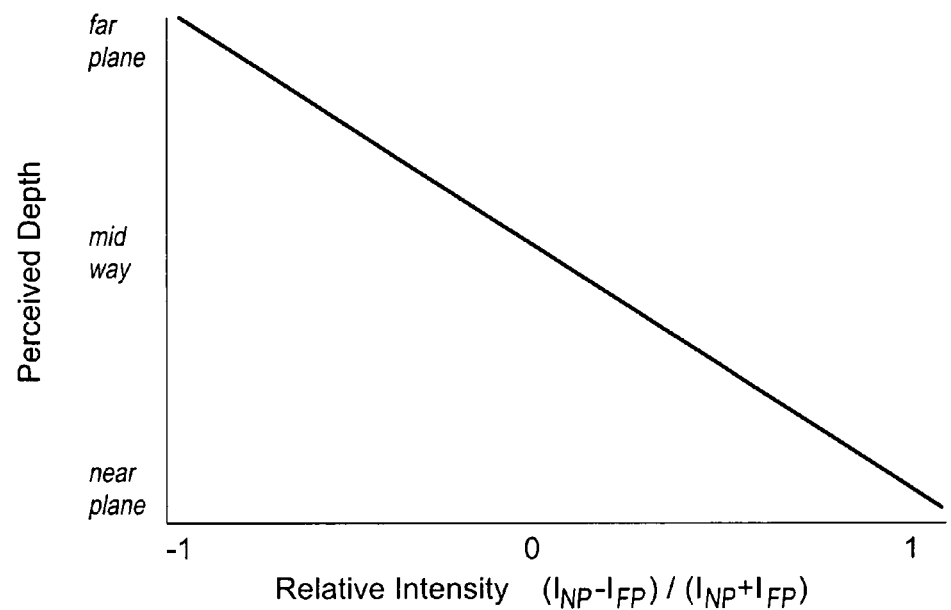
FIG. 2A illustrates an example of the perceived depth of an object as a function of relative intensity.

FIG. 2A illustrates an example of the perceived depth of an object as a function of RI. As shown in FIG. 2A, in one example, the depth of an object is predicted by the intensity values in two focal planes, for example, the NP and the FP, where positive values for the RI are indicative of those instances in which the INP dominates over the IFP, and negative values of the RI are indicative of those instances in which the IFP dominates over the INP. When RI is zero, the intensity values for the IFP and the INP are substantially the same, which results in the user perceiving the OOI midway in the volume created by the two focal planes.

When a projected object is only illuminated in the FP, and the NP is completely dim, the image of the object will be perceived at the depth of the FP. In this case, VC and VA are both registered to the FP. When a projected object is only illuminated in the NP plane, and the FP plane is completely dim, the object will be perceived at the depth of the NP. In this case, the VC and VA are both registered to the NP. However, when the total illumination of the image is distributed across the two focal planes, the OOI will be perceived at a distance or depth between the two focal planes that varies according to the RI of the FP and the NP. For example, if the total luminance reflected by the object at each pixel corresponding to the object is distributed equally in the two planes (i.e., 50% in the NP and 50% in the FP), the object will be perceived as floating at a distance D that is ½ $\Delta$ between the two focal planes. Therefore, in one example, the vision system may provide a gradient light field according to a linear relationship (e.g., as shown in FIG. 2A) of the distribution of the total luminance reflected by the object at each pixel in each of the two focal planes allowing the system to render an object as perceived by a viewer at any fractional $\Delta$ between the two focal planes. In one embodiment, the distance $\Delta$ is less than or equal to 0.66 diopters, for example, for comfort of a viewer of the gradient light field.

Figure 2B:
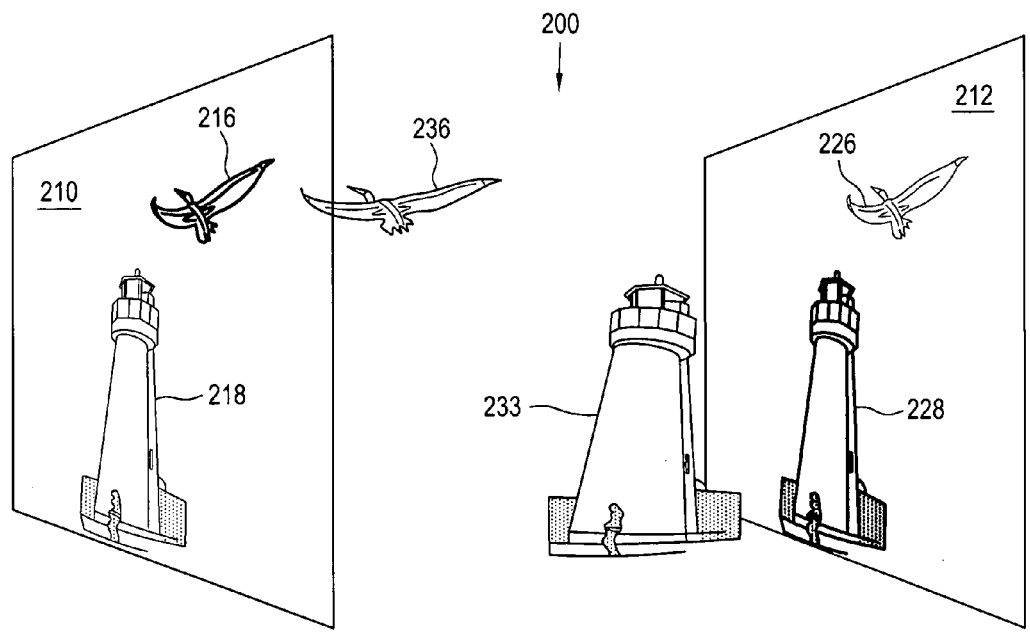
FIG. 2B illustrates an example of providing two focal planes and illuminating a scene using the exemplary function of FIG. 2A.

According to the relationship shown in FIG. 2A, VC and VA converge and accommodate, respectively, at the plane of apparent (or illusory) depth of the projected OOI between the two focal planes, for example, as illustrated in FIG. 2B. As shown in FIG. 2B, a scene 200 is depicted with two OOIs, for example, a lighthouse and a pelican. In this example, the vision system provides two focal planes 210 and 212, providing a NP and a FP, respectively. As shown in FIG. 2B, an image 216 of the pelican and an image 218 of the lighthouse are projected in the NP 210. In this example, the intensity of the image 216 of pelican is higher than the intensity of the image 218 of the lighthouse in the NP 210. In addition, an image 226 of the pelican and an image 228 of the lighthouse are projected in the FP 212. In this example, the intensity of the image 226 of pelican is lower than the intensity of the image 218 of the lighthouse in the FP. The resulting image as perceived by a viewer of the scene 200, includes a pelican 236 and a lighthouse 238 as they appear in the perceptual volume as an effect of the RI of each of the objects in the two planes. In this example, the pelican 236 appears to the viewer to be closer to the NP than to the FP, and the lighthouse 233 appears to the viewer to be closer to the FP than to the NP. VC and VA are jointly focused onto one or the other OOI according to which object the observer is currently viewing. As a result, a 3D scene 200 is perceived by a viewer while maintaining and/or optimizing comfort of the viewer no matter which OOI the user is looking at in the scene 200. In one example, the distance $\Delta$ between the NP and the FP may be expressed as $0.5 \leq \Delta \leq 0.66$ diopters in order, for example, to provide a scene with enhanced viewer comfort.

It will be appreciated that more than two focal planes may be used to provide a perceptual volume in space. For example, the vision system may implement a multi-planar gradient light field by providing three or more focal planes to expand the depth or range over which a volume is created for perception by a viewer. In one implementation, the focal planes have corresponding 2D locations and specific depths in order to achieve an optimal separation for the volume. In one implementation, the separation between two adjacent planes may be selected to enhance comfort of a viewer of the perceived 3D OOIs. For example, the depth or distance between focal planes may be selected to be equal to or less than 0.66 diopters to provide an exemplary zone of comfortable vision around each focal plane equal to substantially 0.33 diopters. One such example of a configuration of a multi-planar gradient light field is illustrated in FIG. 2C.

Figure 2C:
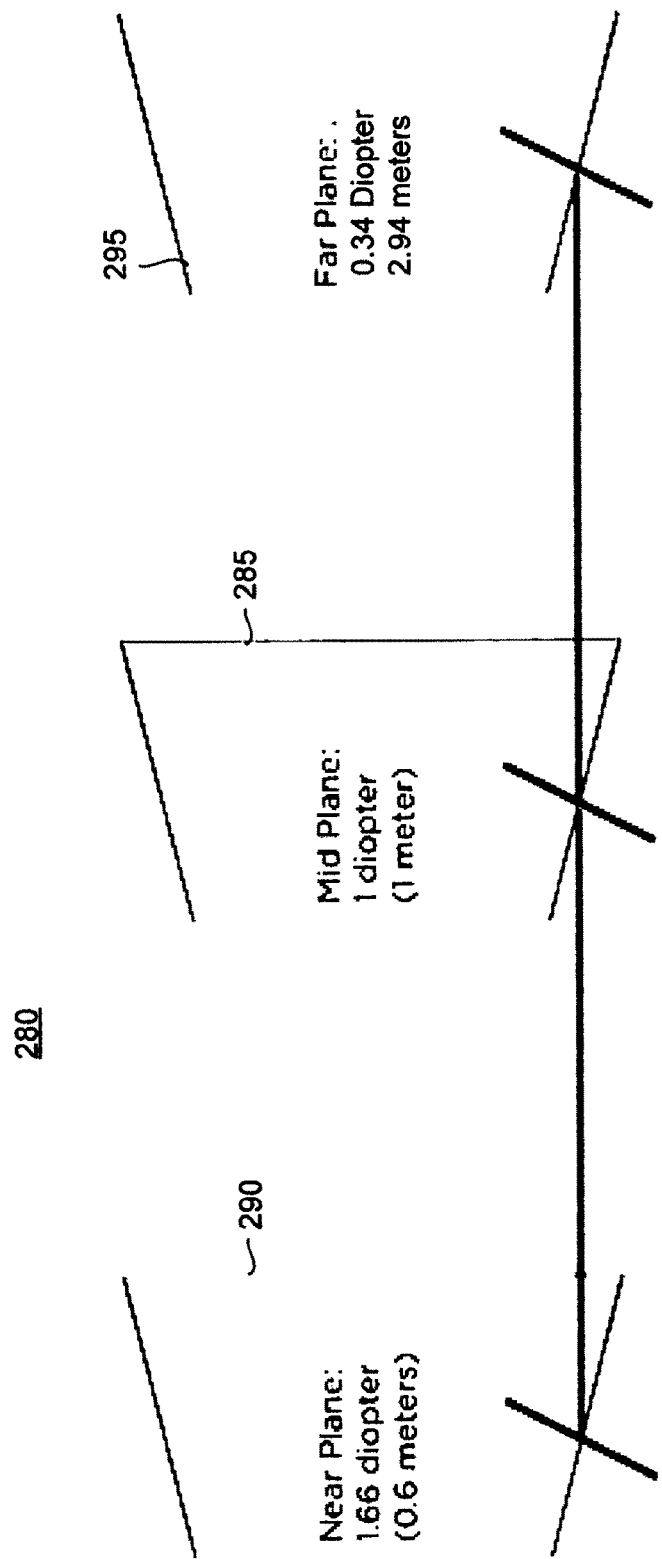
FIG. 2C shows one example of a configuration to produce a multi-planar gradient light field that includes three focal planes.

FIG. 2C shows one example 280 of a configuration to produce a multi-planar gradient light field that includes three focal planes. According to this example, a mid-plane (MP) 285 is positioned between a NP 290 and a FP 295. In one implementation, the focal planes may be positioned at relative distances corresponding to the optical powers of 0.34, 1, and 1.66 diopters for the FP, the MP and the NP, respectively. However, these distances are exemplary and other distances and configurations may be used.

In one example, multiple focal planes (e.g., 2 or more planes) may be created using two or more light sources, such as, for example, displays. For example, two displays may be used to provide the imagery for the gradient light field described above, or three or more displays may be used to provide the imagery for the multi-planar gradient light field described above. In one implementation, the gradient light fields are generated by configuring, positioning, stacking or overlaying multiple displays at different distances from a single focus optical element. In one example, the optical element may be one or more lenses, such as those provided by eye image regions of visor (e.g., an optical combiner), a monocle, or glasses and/or the line having a specified curvature. In one embodiment, the displays are positioned relative to the optical element and a user, such that light emitted from the display is reflected by the optical element to the eyes of the user who perceives the reflected light as an image. Independently of the focal length, the farther the light source or display is positioned from the optical element, the more distant the associated projected focal plane will appear to the viewer.

In one embodiment, the display farthest from the optical element may be implemented using a liquid crystal display (LCD) to project the FP; however, other displays also may be used such as light emitting diode (LED) displays, surface-conduction electron-emitter display (SED), and/or plasma displays, among others. In one embodiment, each additional focal plane that is generated at distances closer than the FP may be implemented using a transparent display that allows light emitted from a farther display to pass through the transparent display towards the optical element before being reflected to the eyes of a user. In one embodiment, displays arranged in this configuration are stacked. In one example, a transparent organic light emitting diode (OLED) display may be used for each additional focal plane provided by a transparent display. In one general aspect, because an OLED has self-luminous pixels, an OLED is not dependent, for example, on the brightness of a backlight of the LCD used to generate the FP. If an LCD is used to generate the FP of a stack of displays, the backlight of an LCD may be strongly attenuated in a multilayer stack of displays. Therefore, the use of a self-emitting OLED for close plane generation may be used to obviate or mitigate such attenuation in a stack of displays.

The number of focal planes used for any particular design or embodiment may be chosen to achieve an optimal or desired range of distances to accommodate many different implementations or requirements criteria. One example providing three focal planes is shown in FIG. 3A. As shown in FIG. 3A, which demonstrates one embodiment of the invention, a vision system 300 includes one LCD display 301 and two OLED displays 305, 307. Although this example shows the use of an LCD and two OLEDs, other combinations are possible. For example, a thin film transistor (TFT) LCD display without a backlight (i.e., a transparent LCD) could be used in place of an OLED. The LCD display 301 is arranged at a distance furthest from the optical element 310 to provide an image corresponding to the FP 315. A first OLED display 305 is arranged a distance between the LCD display 301 and the optical element 310 to provide an image corresponding to the MP 317. A second OLED display 307 is arranged at a distance between the first OLED display 305 and the optical element 310 to provide an image corresponding to the NP 319. By modulating the intensity of the light corresponding to the same object presented by the different displays, an object may be perceived by a viewer to appear anywhere in the volume 320 bounded by the NP and FP created by light from the displays reflecting from the optical element into the eyes of a user.

In another example, multiple focal planes (e.g., 2 or more planes) may be created using a single light source, such as a segmented display. For example, a single display may be segmented into two portions or segments, in which each portion provides substantially the same image to project the gradient light field described above. In addition, a single display segmented into three or more portions, in which each portion provides substantially the same image may be used to provide the multi-planar gradient light field described above. In another example, two or more displays may be arranged side by side in the same plane to create a single segmented display, in which each display forms a segment of the segmented display. In one implementation, the gradient light fields are generated by configuring, positioning, or locating each of the segments of the display to correspond to a different focus of the multifocal optical element. In one example, the multifocal optical element may be one or more lenses, such as those provided by eye image regions of a visor (e.g., an optical combiner), a monocle, or glasses having a specified curvature providing the different foci associated with each focal plane provided by the vision system. In one implementation, the same object in each segment of the display is modulated in intensity and reflected to the eyes of a user by a corresponding focus of the optical element to a different focal plane corresponding to a desired distance. In one embodiment, a high-resolution LCD display may be evenly segmented into two or more portions where each portion is arranged to emit light directed towards a corresponding different focus of the optical element. The number of focal planes provided by the optical element for any particular design or embodiment may be chosen to achieve an optimal or desired range of distances to accommodate many different implementations or requirements criteria. An example providing three focal planes is shown in FIG. 3B.

As shown in FIG. 3B, in one embodiment, a vision system 330 includes at least one high-resolution LCD display 331 and multifocal optical element 332. The display 331 is segmented into three equal portions 333, 335, and 337. In an alternative example, each portion 333, 335, and 337 may be implemented by a separate corresponding display, such as may be arranged in the same plane. In this example, the display 331 is segmented lengthwise to provide two outer portions 333, 337, which sandwich a middle portion 335. The first outer portion 333 is arranged to correspond with a first focal plane of the multifocal optical element 332 that provides an image corresponding to the FP 345. The middle portion 335 is arranged to correspond with a second focal plane of the multifocal optical element 332 that provides an image corresponding to the MP 347. The other outer portion 337 is arranged to correspond with a third focal plane of the multifocal optical element 332 that provides an image corresponding to the NP 349. By modulating the intensity of the same object in the different display segments 333, 335, and 337, the object may be perceived by a viewer as appearing anywhere in the volume 350 bounded by the NP 349 and FP 345.

It will be appreciated that FIGS. 3A and 3B are provided to illustrate general concepts and that variation may be made in implementation of any actual design. For example, the eyes shown in FIGS. 3A and 3B may not reflect the actual position of the eyes relative to the displays. For example, in one implementation provided by an HMD the displays 301, 305, 307 or 331 may be positioned outside the field of view of a user wearing the HMD. In one example, one edge of the stack or display may be positioned by the physical housing of the HMD relatively near the forehead of a user and above the eyes of the user. In this implementation, light emitted from the displays is reflected by an optical element (e.g., a mirror, a combiner, and/or the like) placed below the display and having a curvature to direct the light emitted from the display into the user's eyes. In addition, a number of different combinations of displays and optical elements may be used. For example, in one implementation the optical architecture as shown in FIGS. 3A and 3B may be separately configured for each eye of a user (e.g., utilizing separate display configurations for each eye). In one example, the choice of any particular implementation or configuration may be selected to optimize characteristics of the device in which the vision system is implemented, such as, for example, the size of the Field Of View (FOV) in an HMD. Different implementations and configurations are outlined with respect to the drawings and are described in further detail below.

Figure 4:
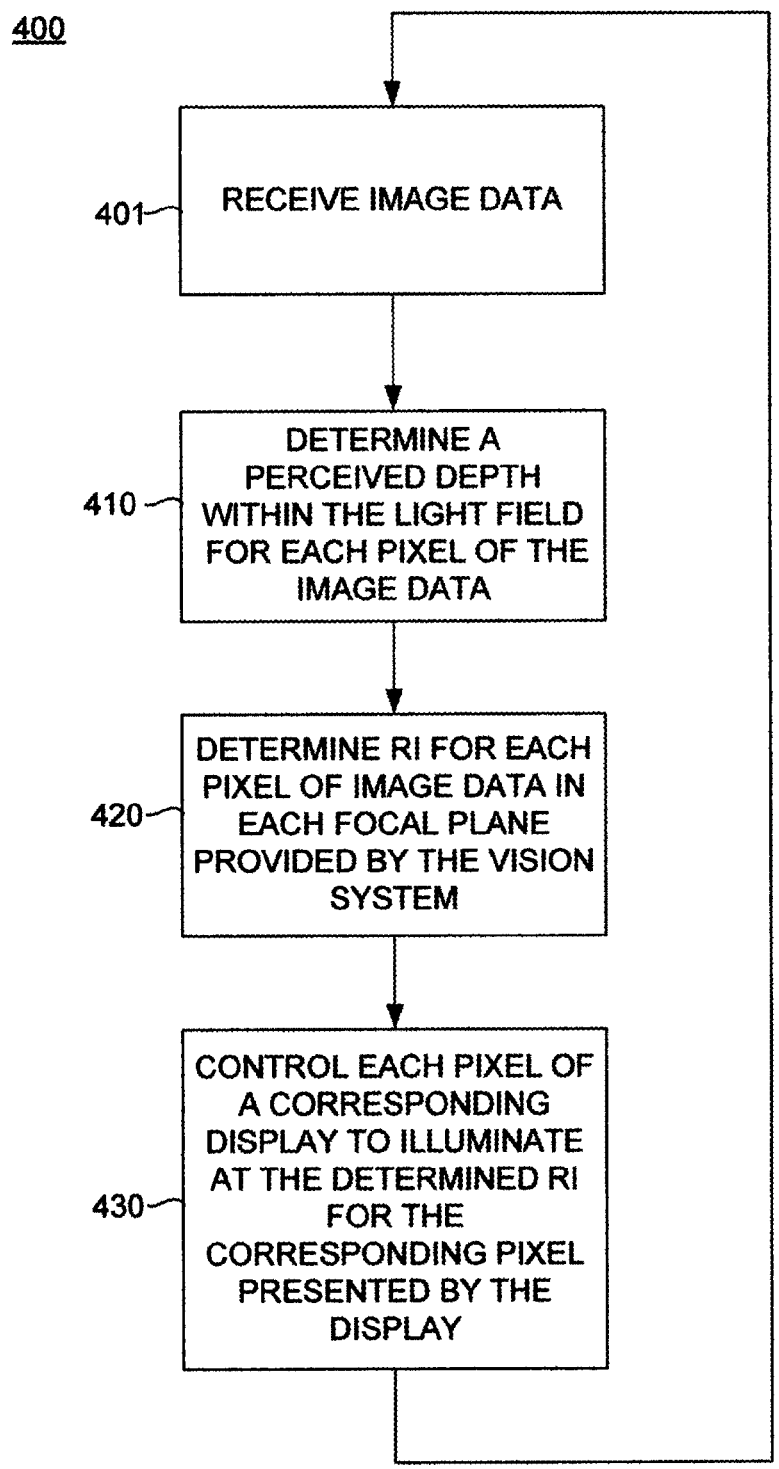
FIG. 4 shows an example of a process for controlling one or more light sources of a vision system to provide a gradient light field.

FIG. 4 shows an example of a process 400 for controlling one or more light sources of a vision system. For example, the process may be implemented by software, hardware, or a combination thereof to control one or more of an LCD display, an active or passive matrix OLED display, a TFT LCD displays without a backlight (i.e., transparent LCD), and/or a high resolution LCD display, and/or the like.

In operation 401, image data are received by at least one component of the vision system. For example, in one implementation for two planes D, D_RI is the received image data, D_NP is the final data rendered on the NP, and D_FP is the final data rendered on the FP. In this example, operation 401 calculates the depth data (DD) relative to the viewer for each pixel in the image (e.g., a graphics processing unit (GPU) renders the image to a frame buffer and the depth data to a separate depth or z-buffer). The image data received by the component may include digital image data associated with content provided by the vision system to user. For example, the digital image data may depict one or more of graphics, a scene, a graphical user interface, a computer game, a movie, content from the Internet, such as web content accessed from the World Wide Web, among others, that are to be presented to a viewer of the vision system.

In operation 410, a perceived depth within the light field is determined by the component for each pixel of the image data to be presented to the viewer. For example, coordinate or other information may be determined or accessed for each pixel of a digital image to be presented. The coordinate or other information may be used by the component to determine where each pixel is to be perceived by the viewer of the vision system within the generated light field. In one implementation of operation 410, the DD calculated in operation 401 is used to determine the perceived depth in the light field. For example, DD is normalized (DD_N) relative to the NP and FP distances as perceived by the viewer (e.g., NP is 1 and FP is −1, and DD_N interpolates linearly from 1 at the NP to −1 at the FP—for example as shown in FIG. 2A). In another example, DD is normalized to a range [0, 1], with NP=0 and FP=1.

In operation 420, an RI is determined for each focal plane provided by the vision system for the pixel of the image data corresponding to the determined perceived depth of the pixel in the light field. For example, the component uses location or coordinate information for the number of focal planes provided by the system to determine the total illumination output for one or more of the light sources corresponding to each of the focal planes in order to render the image at the desired perceived distance by a user as determined, for example, by the RI relation shown FIG. 2A and/or a derivative and/or a variation thereof.

In one implementation, DD_N is used to calculate RI per plane. In this example, the procedure may depend on the display technology, such as, for example, additive display technology and multiplicative display technology. In additive systems, the light from two or more display panels are added together (e.g., in a two panel system Final light=Light #1+Light #2). In multiplicative systems there is a single light source (e.g., a backlight) and each panel will allows for a percentage amount of the light to pass through (e.g., for a two panel system the Final light=BackLight*Panel #1_transmission*Panel #2_transmission).

For example, where DD_N range is [0, 1]:

a. For additive display technology the final intensity as seen by a user is a weighted average of the panels: I=I_NP+I_FP=DD_N*NP+(1−DD_N)*FP b. For multiplicative display technology the final intensity as seen by a user is the product: I=I_NP*I_FP. One technique for calculating I_NP and I_FP is factorization. For example, given that intensity (and/or color) values are in the range [0, 1], a high-performance approximation is to interpolate between D_RI and the maximum possible data value (D_M) (being 1):

$$I\_NP = A*D\_RI + (1-A)*D\_M \qquad \text{i.}$$

$$I\_FP = B*D\_RI + (1-B)*D\_M \qquad \text{ii.}$$

c. A and B are to be calculated based on DD_N. In one implementation, the DD_N domain is mapped onto a logarithmic range.

In operation 430, the component controls each pixel of a corresponding light source or portion of a light source (e.g., a display) to illuminate the corresponding pixel presented by the display at an intensity corresponding to the determined RI. For example, the pixels presented by the display are calculated in operation 420 and stored in a frame buffer. Display drivers may then transfer this data to the physical displays.

The process 400 may be repeated any number of times for digital data received by the component of the vision system. In one example, the component may be one or more processing devices, such as, for example, a graphics processing unit.

Figure 5A:
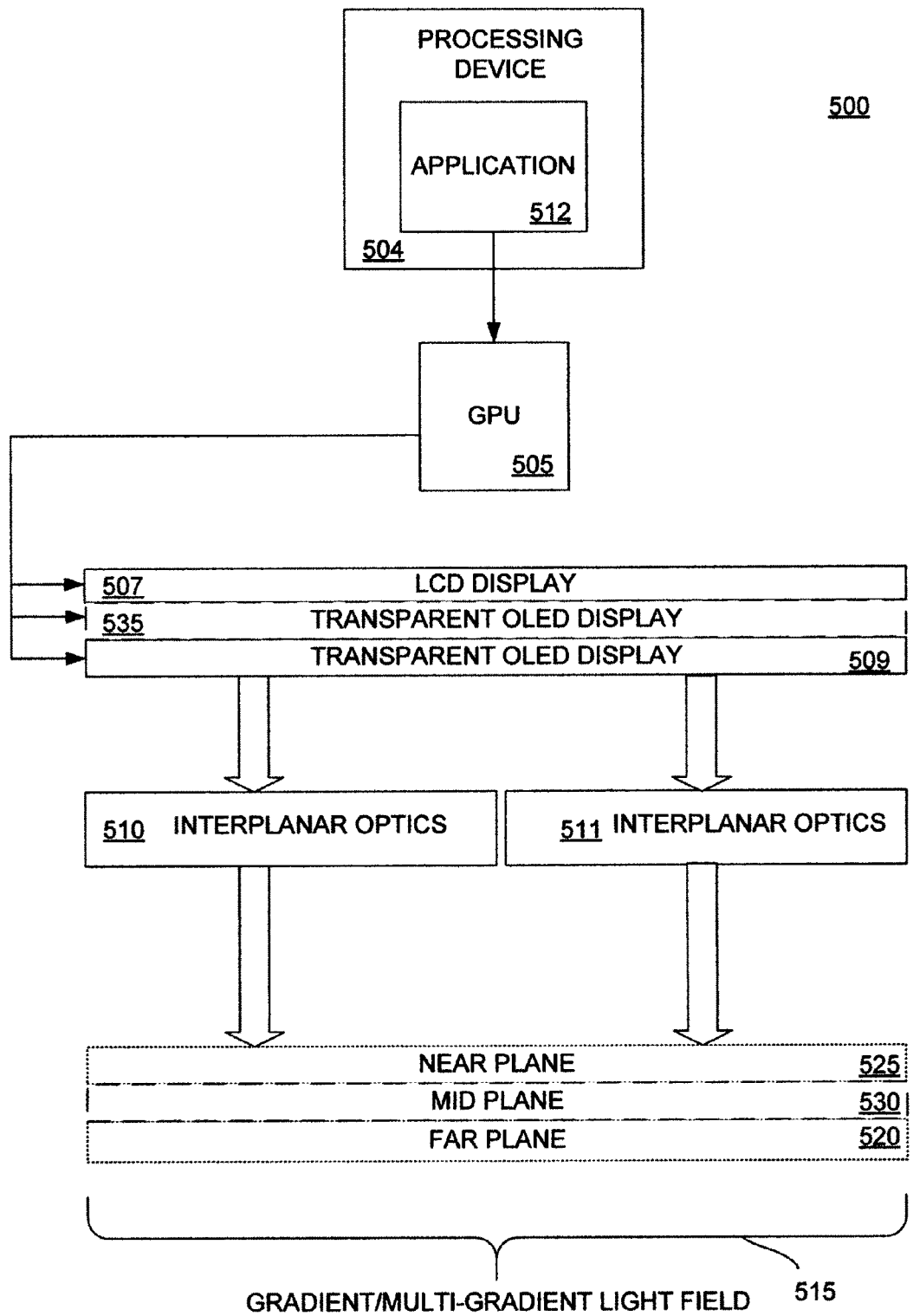
FIGS. 5A, 5B, 5C, and 5D show examples of vision systems providing a gradient or a multi-gradient light field.

FIGS. 5A, 5B, 5C, and 5D show examples of vision systems 500, 501, 502, and 503 providing a gradient or multi-gradient light fields. As shown in FIG. 5A, the vision system 500 may include a processing device 504, a graphics processing unit (GPU) 505, at least two displays 507, 509, and inter-planar optical elements 510 and 511, and may include other components not shown (such as, for example, one or more storage devices and/or buffers, one or more interfaces, a power source, and/or the like).

The vision system 500 includes a processing device 504. The processing device 504 may implement one or more applications or programs including other software, such as an operating system. In one example, the processing device 504 includes and/or interfaces with an associated memory (not shown) storing an application 512 implemented by the processing device 504, such as may generate digital image data depicting one or more of graphics, a scene, a graphical user interface, a computer game, a movie, content from the Internet, such as web content accessed from the World Wide Web, among others, that are to be presented to a viewer of the vision system 500. Examples of applications includes media players, mobile applications, browsers, video games, graphic user interfaces, and/or the like.

The vision system 500 also may include a GPU 505. The GPU 505 may be one or more of a standalone graphics processor, an integrated graphics processor, or a combination thereof configured to implement the process 400 and/or control two or more displays, such as an LCD display 507 and a transparent OLED display 509 for the instance where two focal planes are provided. The GPU may include various components, such as one or more storage devices, such as a memory provided in memory slots/or and a flash memory storing BIOS, a clock, a memory controller, a graphics controller, a central processing unit, an I/O controller, and various communications I/O interfaces (e.g., communication buses, PGA, PCI and PCI express in addition to other ports). In addition, the GPU may have dedicated memory and/or may share memory with the processing device 504.

As shown in FIG. 5A, the GPU 505 drives an LCD display 507 to emit light corresponding to an image that is reflected by the inter-planar optical elements 510 and 511 to the corresponding eye of user, to provide a FP 520 of the gradient light field 515 as perceived by the user. In addition, the GPU 505 drives a transparent OLED display 509 to emit light corresponding to an image that is reflected by the inter-planar optical elements 510 and 511 to the corresponding eye of user, to provide a NP 525 of the gradient light field 515 as perceived by the user.

In one example, the inter-planar optical elements 510 and 511 each may be implemented as a reflective region of a visor positioned relative to the display to reflect light emitted from the display to a corresponding eye of a user. For example, an eye image region or aperture region of a visor corresponding to the inter-planar optical elements 510 or 511 can be coated using a reflective or semi-reflective series of thin films formed on a region of the visor corresponding to each eye to reflect light emitted from the displays to the eyes of a user to create the perceived light field 515.

The output from the GPU 505 distributes the total illumination to the two displays 507, 509 in order to render the image at a perceived distance as prescribed by RI of each image, for example, using a function such as that shown in FIG. 2A. In one example, the GPU may implement a rendering process described in further detail below. The separation of the two displays 507, 509, the corresponding optical elements 510, 511 and an inter-planar optical interface intensity logic provided, for example, by the GPU 505 generates the two distinct focal planes 520, 525 generating the gradient light field 515 as perceived by the user to appear between their relative distances. For example, to generate the gradient light field 515, the GPU 505 drives the displays 507, 509 to present two similar images with the appropriate proportion of intensity defined at each pixel of each image. In one example, Eq. 1 (provided above) may be used or a derivative thereof (e.g., as described above in process 400). In one embodiment, the inter-planar optical elements 510, 511 having a single focus reflect the light from displays to a corresponding eye of the user at the two focal planes 520, 525 to create the intended depth of the rendered images as perceived by the user.

It will be appreciated that the vision system 500 may provide one or more optional or additional focal planes, such as a MP 530. In this implementation, an additional display, such as a transparent OLED display 535 is provided for each additional focal plane, which is controlled/driven by an additional output of the GPU 505 to generate a multi-gradient light field 515.

Figure 5B:
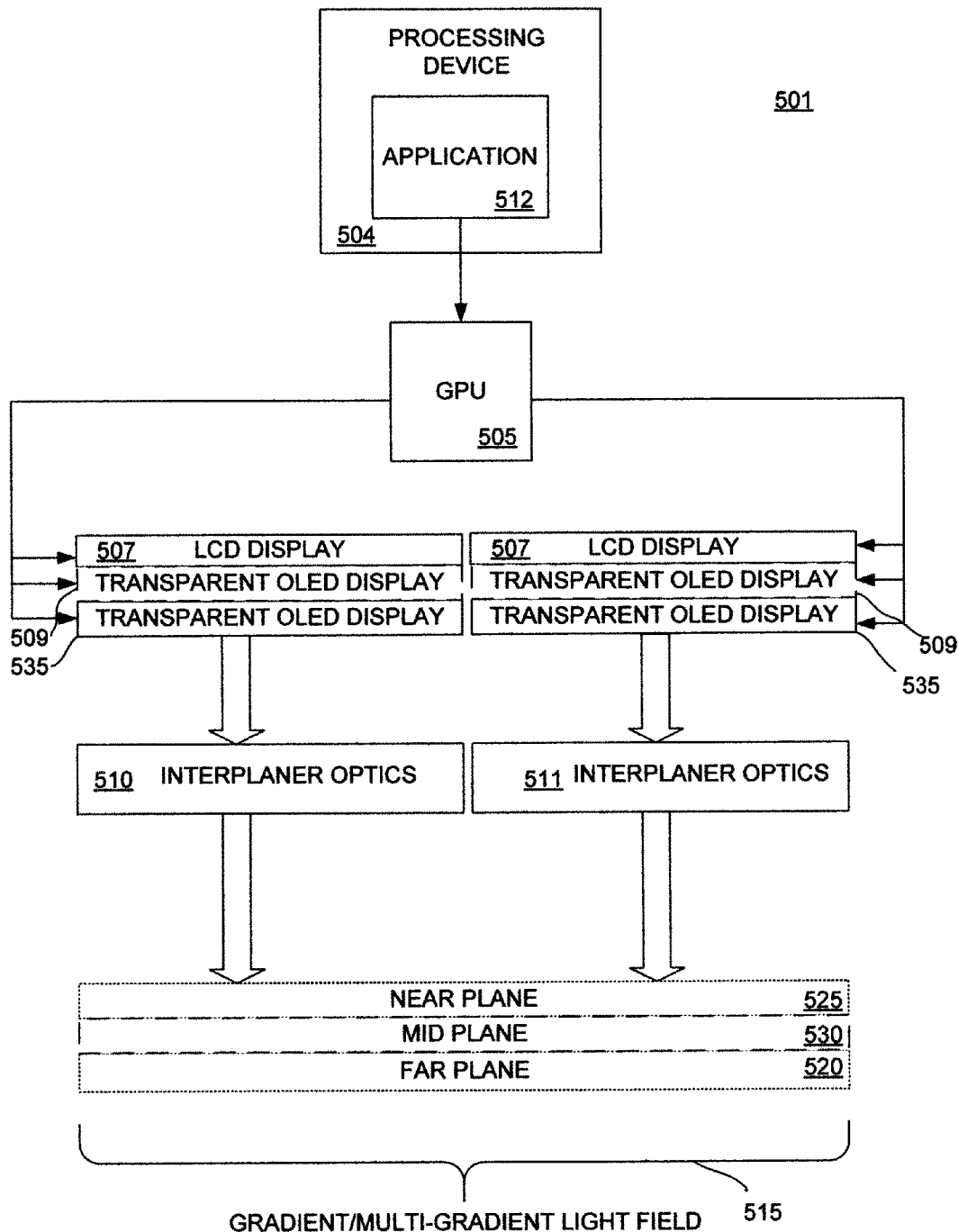

As shown in FIG. 5B, a vision system 501 is similar to that shown in FIG. 5A. The vision system 501 also includes a processing device 504, a GPU 505, and inter-planar optical elements 510 and 511, and/or other components not shown. As shown in FIG. 5B, the vision system 501 includes two sets of displays 507, 509, and optional display 535. In this example, each set of displays is separately controlled by the GPU 505 to provide the images for a corresponding one of the user's eyes; otherwise, the system is the same as described above for FIG. 5A.

Figure 5C:
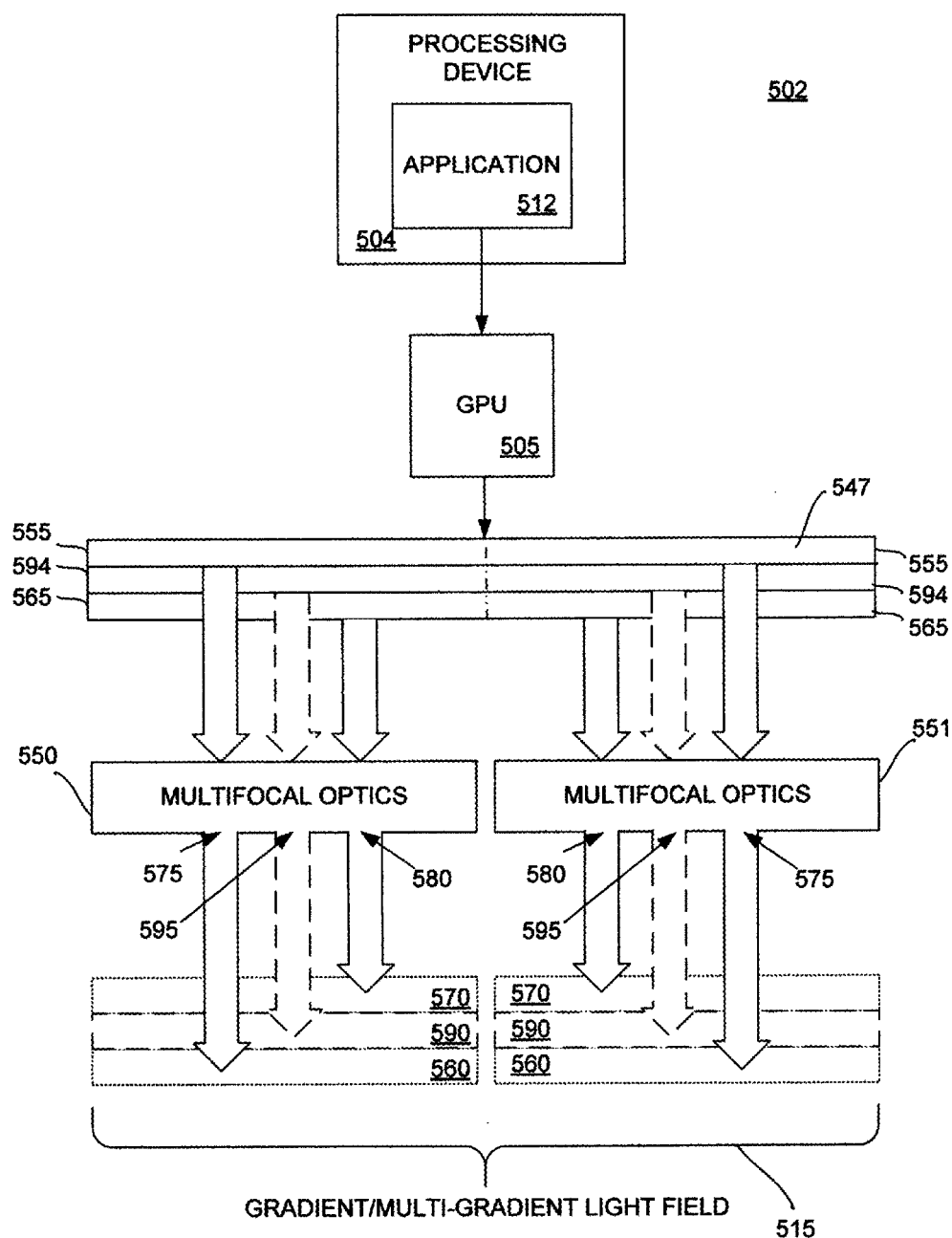

FIG. 5C shows an example of a vision system 502 that also includes a processing device 504, a GPU 505, a high resolution LCD display 547 and multifocal optical elements 550, 551.

The vision system 501 includes a processing device 504, an application 512 implemented by the processing device 504, and a GPU 505, as described above.

In this embodiment, the high resolution LCD display 547 is divided into two halves 552 and 553. For example, one half 552 corresponds to the right eye of a user and the other half 553 corresponds to the left eye of the user. In addition, each half of the display 547 is segmented into two or more portions corresponding to two or more focal planes (e.g., at least a NP and a FP). In one implementation, the GPU 505 controls the intensity of pixels of a first portion 555 of the display to project an image reflected by a first focus of the multifocal optical elements 550, 551 into a corresponding eye of a user at a FP 560 of the gradient light field 515 as perceived by the user. In addition, the GPU 505 controls the intensity of pixels of a second portion 565 of the display to project an image reflected by a second focus of multifocal optical elements 550, 551 into a corresponding eye of a user at a NP 570 of the gradient light field 515 as perceived by the user. The output from the GPU 505 distributes the total illumination to the portions of the display 555, 565 in order to render the image at a perceived distance, for example, using a function such as that shown in FIG. 2A. The multifocal optical elements 550, 551—in this case bifocal optical elements—provide two foci 575, 580 that define the two distinct focal planes 560, 570, generating the gradient light field 515. To generate the gradient light field 515, the GPU 505 drives the display portions 555, 565 to present two similar images with the appropriate proportion of intensity at each pixel of each image. In one example, Eq. 1 (provided above) and/or a derivative and/or variant thereof (e.g., as provided in process 400) may be used. The multifocal optical elements 510, 511, having two foci, project the light from displays into the user's eyes having the specified intensity at the two focal planes 555, 565 to create the perception of depth of the rendered images.

In one embodiment, the vision system 502 may provide one or more additional focal planes, such as an MP 590. In this implementation, the high resolution LCD display 547 may be segmented into additional portions 594 for each additional focal plane. In this case, the multifocal optical elements 550, 551 include an additional focus 595 corresponding to each additional portion 594 of the display 547 to generate a multi-gradient light field 515.

Figure 5D:
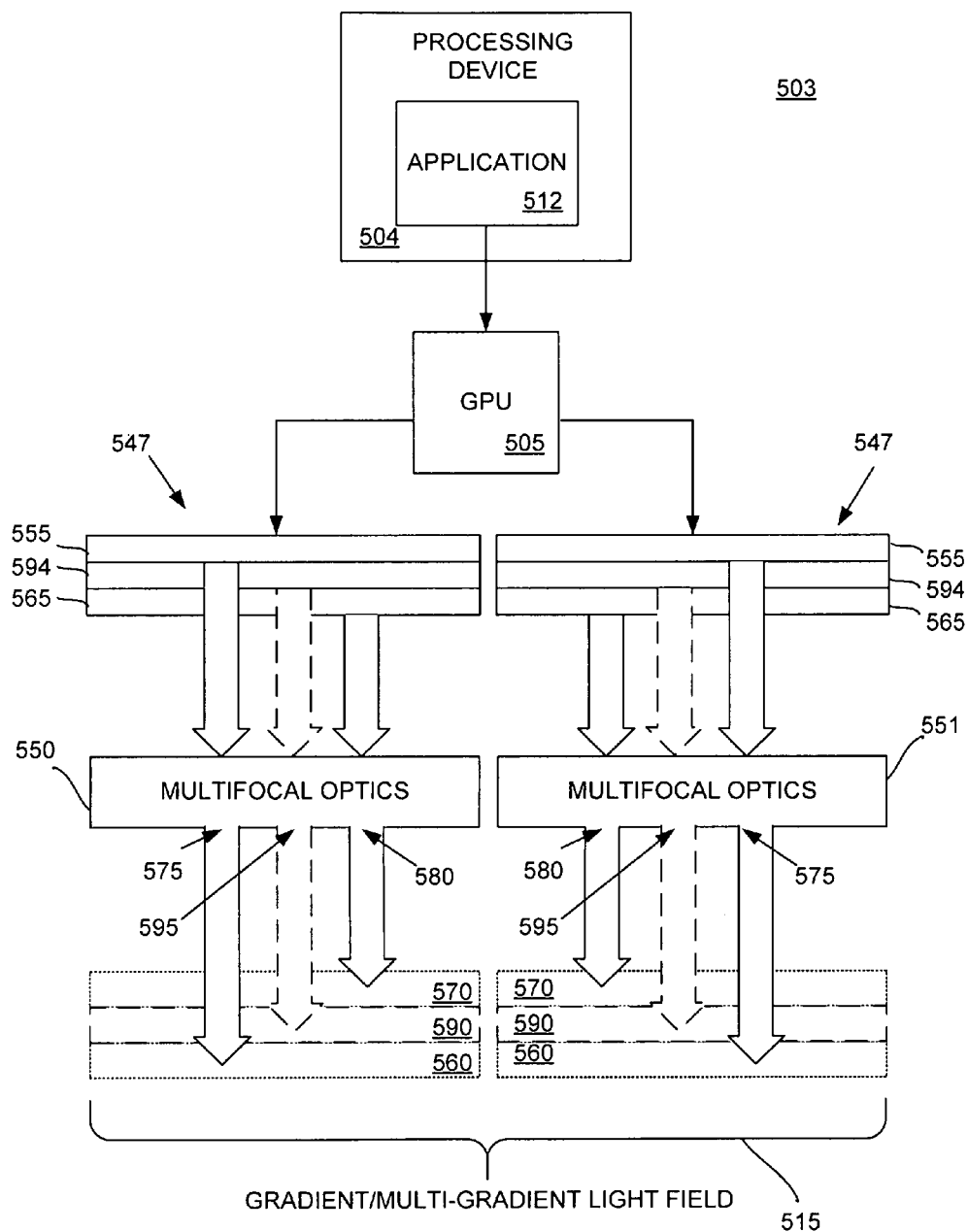

FIG. 5D shows an example of a vision system 503 that also includes a processing device 504, a GPU 505, a high resolution LCD display 547 and multifocal optical elements 550, 551. Similar to FIG. 5B, the vision system 503 includes two sets of displays 547. In this example, each set of displays 547 is separately controlled by the GPU 505 to provide the images for a user's corresponding eye; otherwise, the system operates in the same manner as described above for FIG. 5C.

Figure 6:
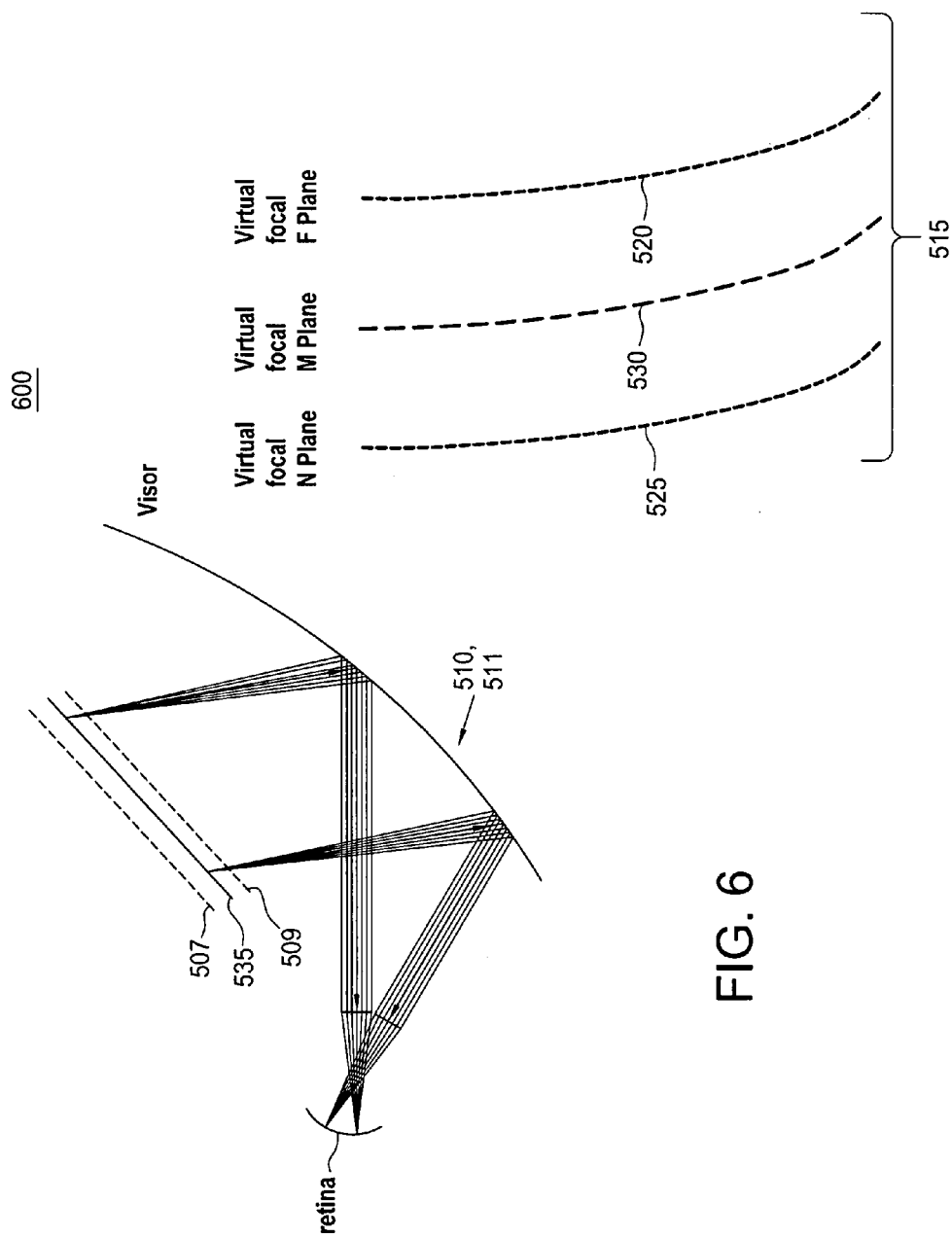
FIG. 6 shows an example of a configuration of the systems shown FIGS. 5A and 5B.

FIG. 6 shows one example of a configuration 600 of the systems 500 and 501 in the Y-Z plane. As shown in this example, the inter-planar optical elements 510 and 511 each are implemented as a reflective region of a visor positioned relative to the displays 507, 509, and 535. The visor is curved at the regions 510 and 511 to reflect light from the display to a corresponding eye of a user to create the perceived light field 515 (composed of virtual focal planes 520, 525, 530) on the retina of the eyes of a user. In this example, there are two different eye rotations corresponding to the two different light paths.

Figure 7:
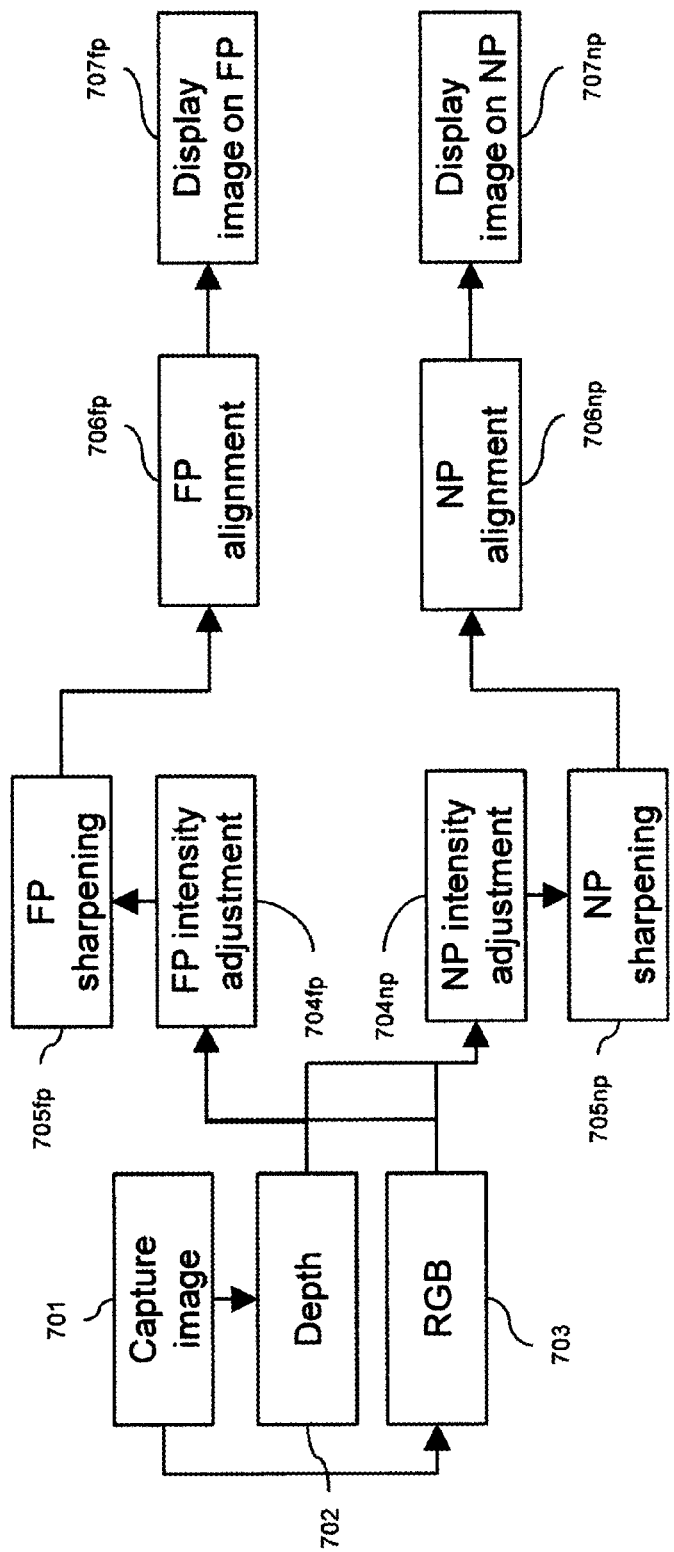
FIG. 7 shows an example of a process for controlling one or more light sources of a vision system to provide a gradient light field.

FIG. 7 illustrates an example of a process of controlling one or more light sources of an HMD to provide visual accommodation. Operation 701 captures the image for use in the visual accommodation process. For example, the image may be an image rendered by the GPU. The images rendered by the GPU for output to a display include various information for each pixel of the display, such a color information, depth, and intensity. In one example, the GPU renders the image to a frame buffer and the depth data to a separate depth or z-buffer. Prior to outputting the image to the display, the GPU performs several operations to provide visual accommodation. In operation 702, the GPU reads the depth information from the depth or z buffer. In operation 703, the GPU reads color information (e.g., the intensities of the RGB data) for each pixel of the rendered image. The operations 702 and 703 are performed in parallel. The GPU then performs a series of operations 704, 705, and 706 for each focal plane. In this example, the GPU performs operation to generate a display output for two displays corresponding to a near plane (NP) and a far plane (FP). The operations 704, 705, and 706 may be performed in series starting with the first plane (e.g., the NP) and then of another plane (e.g., the FP). The last operation 707 is then performed for the outputs of 706. In another embodiment, the operations 704, 705, 706, and 707 can be performed in parallel for each of the planes formed. In this example, although two planes are generated by the process, one skilled in the art will appreciate that the operations 704, 705, 706, and 707 may duplicated for one or more additional planes (e.g., a mid-plane).

In operation 704 (e.g., 704*np* and 704*fp*) the image intensity of the image for display by each plane is adjusted using one of the techniques described above based on, for example, the display technology used. For example, if an additive display technology is used, then for each plane a weighted average of the images for display is determined (e.g., I=I_NP+I_FP=DD_N*NP+(1−DD_N)*FP). If a multiplicative display technology is used, then the final intensity of each display is determined as a product (e.g., I=I_NP*I_FP).

In operation 705 (e.g., 705*np* and 705*fp*) the corresponding image data—now modified for intensity—is sharpened to account for the configuration of the vision system. For example, diffraction occurs when displays are arranged such that light from one display travels through one or more displays. For example, in the case of a two display configuration, the display providing an image for the NP causes diffraction of the light from the display providing an image for the FP. In this example, diffraction is caused by the light traveling from display corresponding to the FP has to travel through display corresponding to the NP. Diffraction occurs when light traveling as a wave encounters an obstacle, in this case the display corresponding to the NP. One skilled in the art will appreciate diffraction increases with each additional display light travels through. The severity of the diffraction is also determined by the panel technology and configuration. In this example, because diffraction causes the image corresponding to FP to appear blurred, soft or out of focus, a sharpening filter is applied by in this operation to compensate for the diffraction. In one example, an unsharp mask may be used to compensate for diffraction. The overall amount of sharpening is adjusted according to the physical panel, depth, and the amount of diffraction introduced. For example, the closer the pixel is to the NP, the less the sharpening that is performed, and the closer the pixel is to the FP, the greater the sharpening that is performed.

In operation 706 (e.g., 706*np* and 706*fp*), the image data—the intensity of which having now been modified by plane, and having been sharpened—the corresponding pixels of each image are aligned so that the correct pixels of the provided planes (e.g., the NP and the FP) are integrated into the final image by the eye. For example, each display outputs the same image with varying intensities at individual pixels to provide the gradient light field. However, because of the paths traveled by the light from the different displays, the image must be aligned to account for this difference. The alignment operation allows the user to fuse the image provided by the two planes. FIG. 7 shows one example of the alignment provided by this operation.

In operation 707 (e.g., 707*np* and 707*fp*) the final output image is displayed on a display corresponding to plane depth (e.g., the NP or the FP) on a physical display panel.

Figure 8:
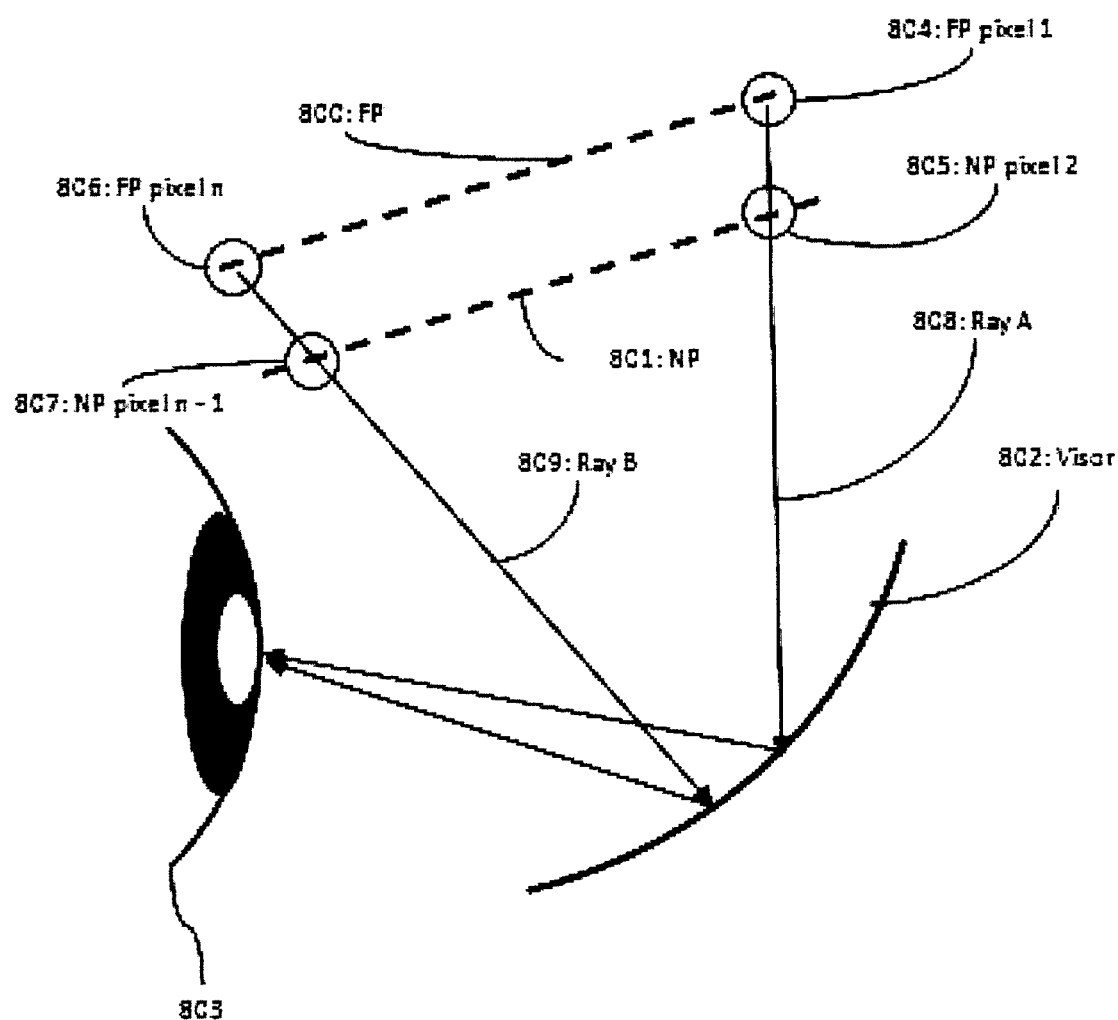
FIG. 8 shows an example of alignment of images for display in a vision system.

FIG. 8 shows one example of the alignment provided by operation 706. As shown in FIG. 8, two displays 800 and 01 are provided. The display 800 emits light for an image A' having a first set of intensities corresponding to the FP, and display 801 emits light for an image A" having a second set of intensities corresponding to the NP. The light emitted from display 800 passes through the display 801. The light emitted from both displays as images A' and A" are reflected by an optical element 802 into the eye 803 of user of system where they are combined as image A. In order to fuse as image A, the pixels of each display providing images A' and A" are aligned.

For example, each display 800 and 801 includes a number of pixels. However, because of the separation of the displays, the pixels providing the image on each of the displays must be aligned. For example, for pixel A of an image presented by the system, pixel A is mapped to pixel 1 804 of display 800 and pixel 2 805 of display 801. Light emitted by pixel 1 804 of display 800 and the light emitted by pixel 2 805 corresponding to Ray A 808 are reflected and combined in the eye 803 of the user. Similarly, light emitted by pixel n 806 of display 800 and the light emitted by pixel n−1 807 corresponding to Ray B 809 are reflected and combined in the eye 803 of the user. In this manner, the correct pixels from each of the planes may be integrated into the final image by the user's eye and other physiology.

FIG. 8 illustrates that the image displayed on the NP by display 801 is rendered smaller than the image display on FP by display 800 (or conversely the image on FP is rendered larger than the image on NP). This necessity results from perspective scaling. For example, as an object moves further away from the eye, the image projected in the retina is smaller. Since the two images should align for proper fusing by the eyes and physiology of a user, the further image may be scaled up or the nearer image may be shrunk so the sizes of each image look the same from the eyes' perspective. As shown in FIG. 8, the first pixel on FP corresponds to the second pixel on NP, and the last pixel on FP corresponds to the second last pixel on NP. In this example, the first pixel on NP does not have a corresponding pixel on FP, and similarly the last pixel on NP does not have a corresponding pixel on FP. In this case, these pixels may be rendered as black or not illuminated.

Dynamic Light Field

According to another exemplary embodiment of the systems, methods, and the techniques described herein, a dynamic light field is provided by a vision system generating 3D imagery for a user of the vision system while maintaining, enhancing, and/or otherwise optimizing comfort of the user viewing the imagery. Embodiment of the various components and configurations of the vision system are described in more detail below.

In one embodiment, the vision system provides a dynamic light field using hardware and software architectures that enable real optical focus onto the OOIs at any given fixation by a user of the vision system viewing the OOIs. In the following examples, the dynamic light field is based on hardware and/or software architectures that may employ the properties of the human ocular-motor system to form a sharp 3D digital image. In one embodiment, the 3D image is created by dynamically modulating the focal planes formed by the optical elements of the vision system as a function of the horizontal distance between the two pupils as they rotate to converge onto OOIs at varying distances.

Control of VC by a viewer is voluntary while control of VA is not. Therefore, the vision system uses an eye-tracking system to compute in real time the user's VC, which coincides with the focus of visual attention of the viewer. The focal plane created by the optical element of the vision system may then be dynamically corrected to coincide with the VC of the viewer. As a result, correct focus onto the OOIs is triggered and both VC and VA are continuously coupled. In one embodiment, the vision system architecture includes at least a binocular eye tracker, at least one processing device, and an adjustable focus optical architecture providing a multifocal optical element to generate in conjunction with software a dynamic light field visible to a user of the vision system.

Figure 9:
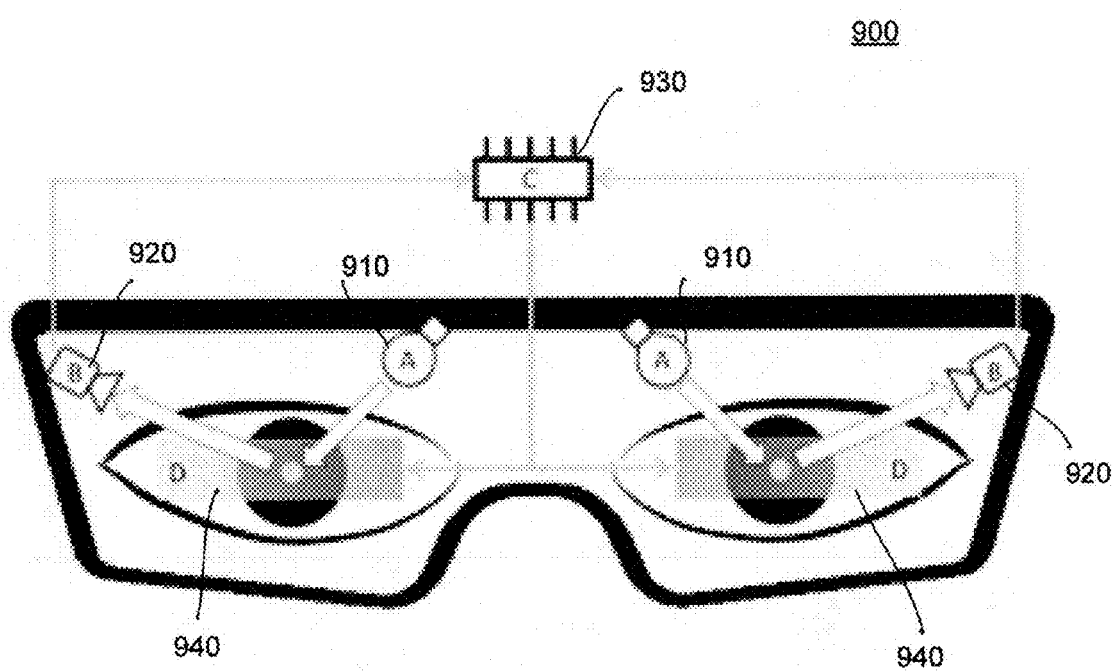
FIG. 9 shows one example of a vision system providing a dynamic light field for viewing three dimensional imagery.

FIG. 9 shows one example of a vision system 900 providing a dynamic light field for viewing 3D imagery.

As shown in FIG. 9, the vision system 900 includes binocular eye tracking components. In one example, the architecture of the eye-tracker includes at least two light sources 910 (one per each eye), such as, for example, one or more infrared (IR) LED light sources are positioned or configured to direct IR light into the cornea and/or pupil of each eye 101. In addition, at least two sensors 920 (e.g., one per each eye), such as, for example, an IR camera are positioned or configured to sense the positioning or line of sight of each eye. For example, the cameras are configured to read the IR reflectance from a corresponding eye, which is processed to determine the pupil and corneal reflectance position. In one example, both the source and the sensors may be mounted to a frame or housing of the vision system, such as a HMD.

In one implementation, the vision system 900 may also include at least one processing device 930. The processing device 930 may implement one or more applications to provide 3D digital image data depicting one or more of graphics, a scene, a graphical user interface, a computer game, a movie, content from the Internet, such as web content accessed from the World Wide Web, among others, that are to be presented to a viewer of the vision system 900. Examples of applications includes media players, mobile applications, browsers, video games, and graphic user interfaces, and/or the like.

In one example, the processing device 930 includes an associated memory storing one or more applications (not shown) implemented by the processing device 930. For example, one application is an eye tracker that determines the position of the pupil, which moves with the eye relative to the locus of reflectance of the IR LED source, and maps the gaze position of the viewer in relation to the graphics or scene presented by the vision system. In one example, an application implemented by the processing device 930 integrates the output received from each sensor to compute 3D coordinates of the viewer's gaze that are used as input by the processing device 930 to adjust focus of the vision system 900 using multifocal optical elements 940. A number of different methods for adjusting focus using multifocal optical elements are described in further detail below. In the case IR source and tracker are used, the optical element should reflect IR light. In one example, an optical coating for the eye image regions of a visor of an HMD providing the vision system is selected for spectral reflectivity for concave side. In this example, the dielectric coating is partially reflective (e.g., ~30%) for visible light (e.g., 400-700 nm) and more reflective (e.g., 85%) for IR wavelengths. This allows for virtual image creation, the ability to see the outside world, and reflectance of the IR LED portion of the embedded eye tracker system (all from the same series of films used for the coating).

The vision system 900 may also include one or more combinations of displays and multifocal optical elements 940. The multifocal optical elements 940, driven by the eye tracker application based on the input and calculations made by the processing device, may be implemented using one of a number of different architectures. For example, variable power lenses in combination with a display may be used. The variable power lens optical architecture uses a progressive system that may in turn be based on variable curvature lenses or motorized progressive lenses. Variable power lenses may be implemented in a variety of ways, such as, for example, where the lenses change shape based on electrical input or fluid motility. In another example, motorized progressive lenses use progressive multifocal lenses that move under direction of the system to dynamically re-center the focal plane to maximize the size of the FOV of the optical system.

In another example, a dynamic focus architecture may be used. For example, an optical stack of lenses, or the display, are moved by a motorized system to change the focal plane of digital content based on the output of the eye tracker application. For example, a motor controlled by the processing device is coupled with the display to move the display within a predetermined range of positions. For example, when the processing device reads and processes the position data obtained from the eye trackers to determine a user is looking at a far object, the processing device controls a motor to move the display away from the system optical elements. As a result, the light emitted from the display travels a further distance to the optical element prior to reflection into the eyes of the user, which moves the focal plane perceived by the user. Therefore, content presented by the display is perceived by the viewer as being farther away from the user to match where the far object is located. In a similar manner, when the processor reads new output from the eye tracker application and determines the user has changed focus to look at a near object, the processor controls the motor to move the display closer to match the digital content presented by the display at a focal distance coinciding with the perceived location of the near object.

In yet another example, a variable light guide may be implemented by the vision system 900. In this example, a system of oriented and motorized mirrors is moved to dynamically adapt the length of the light guide to provide variable focus of the vision system 900.

In yet another embodiment, an electrically tunable liquid lens (the "liquid lens") is used to move the focal plane. In this example, a lens is placed between the display source and the optical element. In one example, the liquid lens may be used. The liquid lens may include a piezoelectric membrane to control optical curvature of the lens, such as by increasing or decreasing the liquid volume in the lens chamber. A driving voltage for the membrane is determined by the processing device based on the output from the eye tracker application to tune the focal plane to match that of objects in the real environment the user is viewing.

Figure 10:
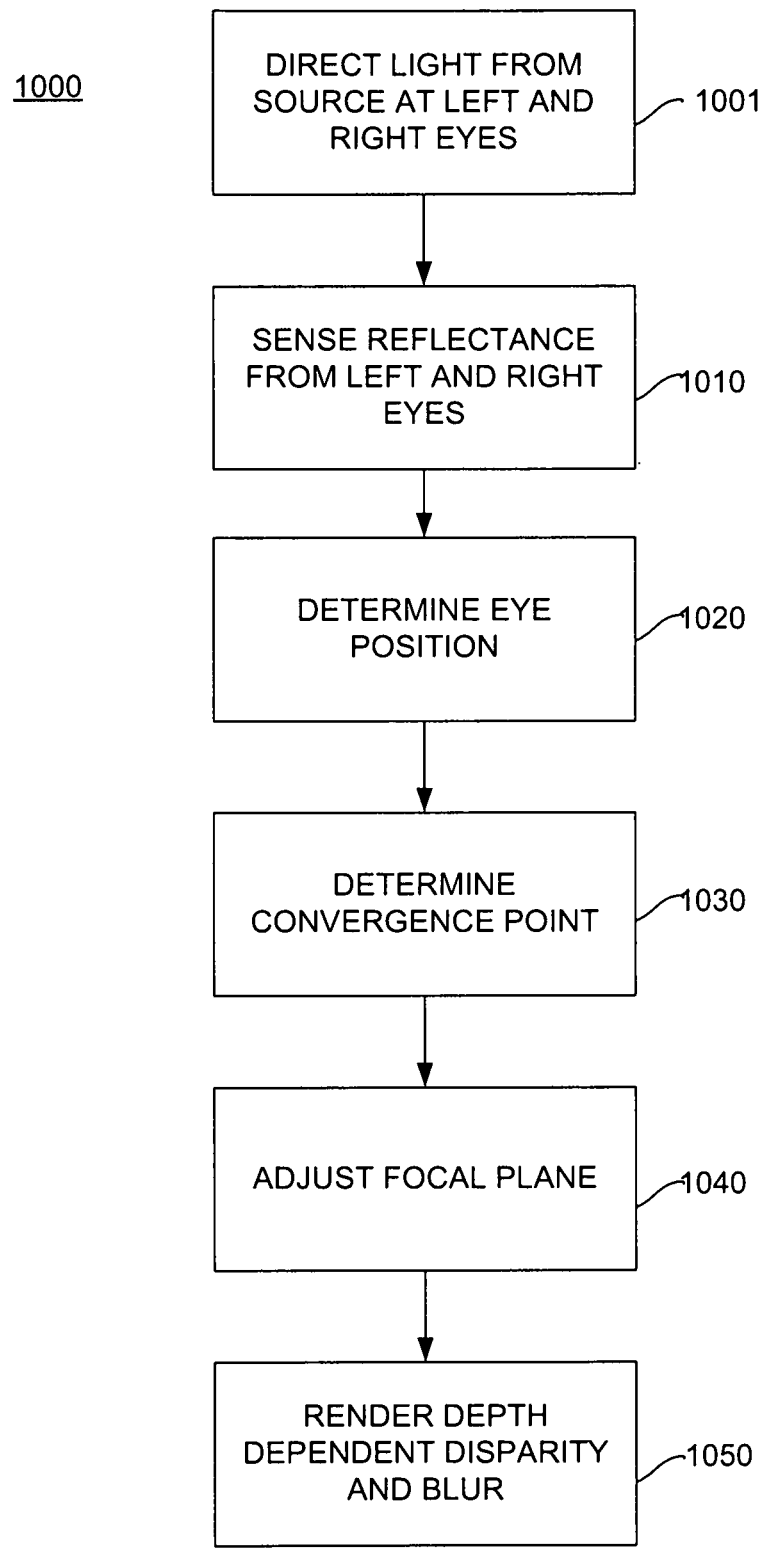
FIG. 10 shows one example of a process implemented by the vision system of FIG. 9.

FIG. 10 shows one example of a process 1000 implemented by the vision system 900.

According to the process 1000 shown in FIG. 10, in operation 1001, light from a source is directed at the left and right eyes of a user of the vision system. For example, an IR light source may be configured within the vision system to direct light at each of the eyes of a viewer. In one embodiment, the source may be configured in relation to the frame of housing of an HMD to direct light from the source at the cornea/pupil area of the viewer's eyes.

In operation 1010, reflectance of the light source is sensed from the left and right eyes, and in operation 1020, the eye position of each eye is determined. For example, one or more IR sensors may be positioned to sense the reflectance from the cornea and pupil of each eye. In one implementation, an IR camera may be mounted to a frame or housing of an HMD configured to read the reflectance of the IR source from each eye. The camera senses the reflectance, which is processed to determine a cornea and/or pupil position for each eye.

In operation 1030, the convergence point of the viewer is determined. For example, the output from the IR cameras may be input to a processing device. The processing device integrates the eye positions (e.g., the cornea and/or pupil position for each eye) to determine a coordinate (e.g., a position in 3D space denoted, e.g., by x, y, z coordinates) associated with the convergence point of the viewer's vision. In one embodiment, the convergence point coincides with an OOI that the user is viewing at that time. In one example, system determines the coordinate of the pixel that the eye is fixated on, fixation coordinate (FC), from the output of the eye tracker. The coordinate is used to look up the depth information from a captured image. For example, when a GPU renders the image to a frame buffer and the depth data to a separate depth or z-buffer, the depth information may be read from the buffer. The retrieved depth information may be a single pixel or aggregate of pixels around the FC. The depth information is then used to determine the focal distance. In another example, the FC is used to cast a ray into the virtual scene. In one implementation, the first object that is intersected by the ray may be determined to be the virtual OOI. The distance of the intersection point of the ray with the virtual OOI from the viewer is used to determine the focal distance.

In another example, the FC is used to cast a ray into the virtual scene as perceived for each eye. The intersection point of the rays is determined as the convergence point of the eyes. The distance of the intersection point from the viewer is used to determine focal plane.

In operation 1040, the focal plane of the vision system is adjusted. The vision system uses the determined convergence point to adjust the focal plane to match the CP. For example, coordinates of the convergence point are converted into a corresponding charge to change shape based of the lens to coincide focus of the lens with the coordinates. In another example, progressive multifocal lenses are moved to dynamically re-center the focal plane to coincide with the determined coordinates. In another example, a motor is controlled using the determined coordinates to move the display to a position corresponding to the coordinates.

Depth dependent disparity and blur are rendered by the vision system (1050). Independent of the specific optical architecture used for this process 1000, a variable focus of the vision system causes the rendering of all objects to be displayed at their sharpest focus, regardless of their depth. To account for this and create a realistic depth of focus (DOF), the processing device implements a software interface to adjust the digital objects provided in a scene that lie outside the determined focal plane by implementing a match disparity (i.e., the horizontal offset between the two eyes), and by blurring the objects presented in a scene by the system to match the optical blur at the relative depth difference.

Figure 11A:
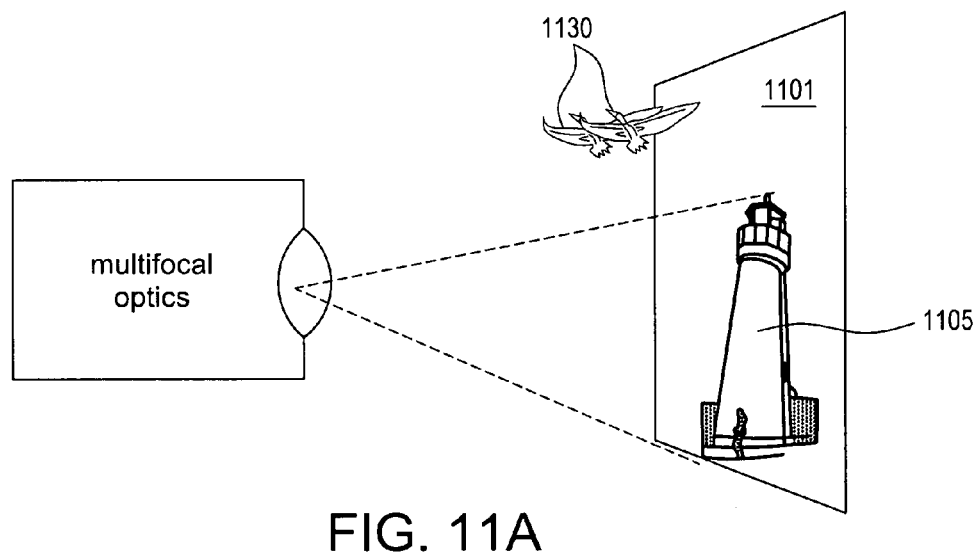
FIGS. 11A and 11B illustrate an example of the treatment of objects rendered by the vision system in two different focal planes.
Figure 11B:
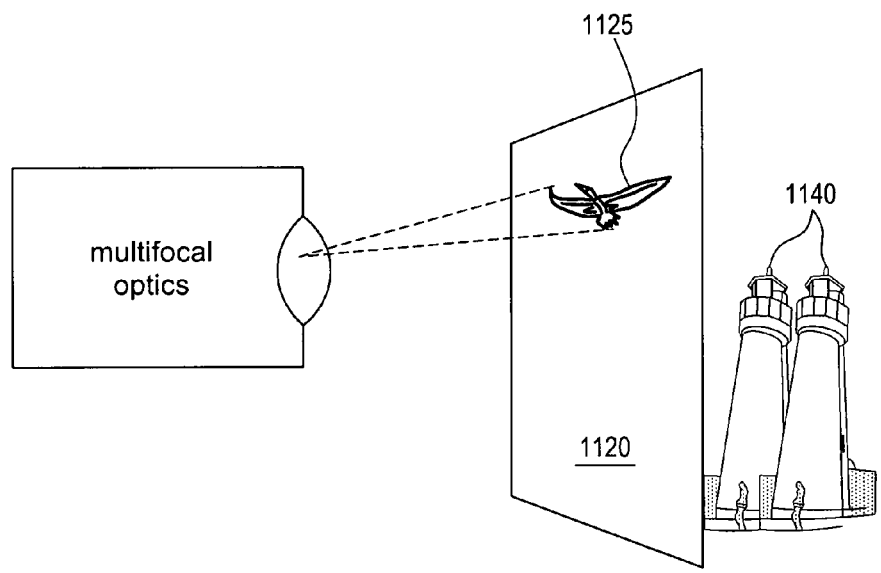

FIGS. 11A and 11B illustrate an example of the treatment of objects rendered by the vision system 900 in two different focal planes. For example, as shown in FIGS. 11A and 11B two objects are shown (e.g., a pelican and a lighthouse). FIG. 11A shows an example of a focal plane 1101 that is aligned with the CP 1105 of the lighthouse. FIG. 11B shows an example of a focal plane 1120 that is aligned with the CP 1125 of the pelican. In one embodiment, in order to provide a scene consistent with the natural human vision process, the DOF processing generates both disparity and blur of any objects outside the viewer's focal plane (e.g., coinciding with an OOI). For example, as shown in FIG. 11A, the OOI is the lighthouse. Therefore, the pelican, which is outside the focal plane, is blurred 1130 by the vision system. Whereas, as shown in FIG. 11B, the OOI is the pelican. Therefore, the lighthouse, which is outside the focal plane, is blurred 1140 by the vision system. The processing device of the vision system determines the disparity based on, for example, the inter-pupillary distance (IPD) of the user. In one embodiment, the IPD may be determined during a calibration processes that is implemented during setup of the vision system. IPD also may be based on the distance of the virtual object depicted in the scene. The blurring of objects may be realistically applied, for example, using a blurring kernel that blurs the image according to the distance from the currently fixated focal plane in addition to using an estimate of the pupil size (e.g., as determined based on overall lighting conditions).

Figure 12A:
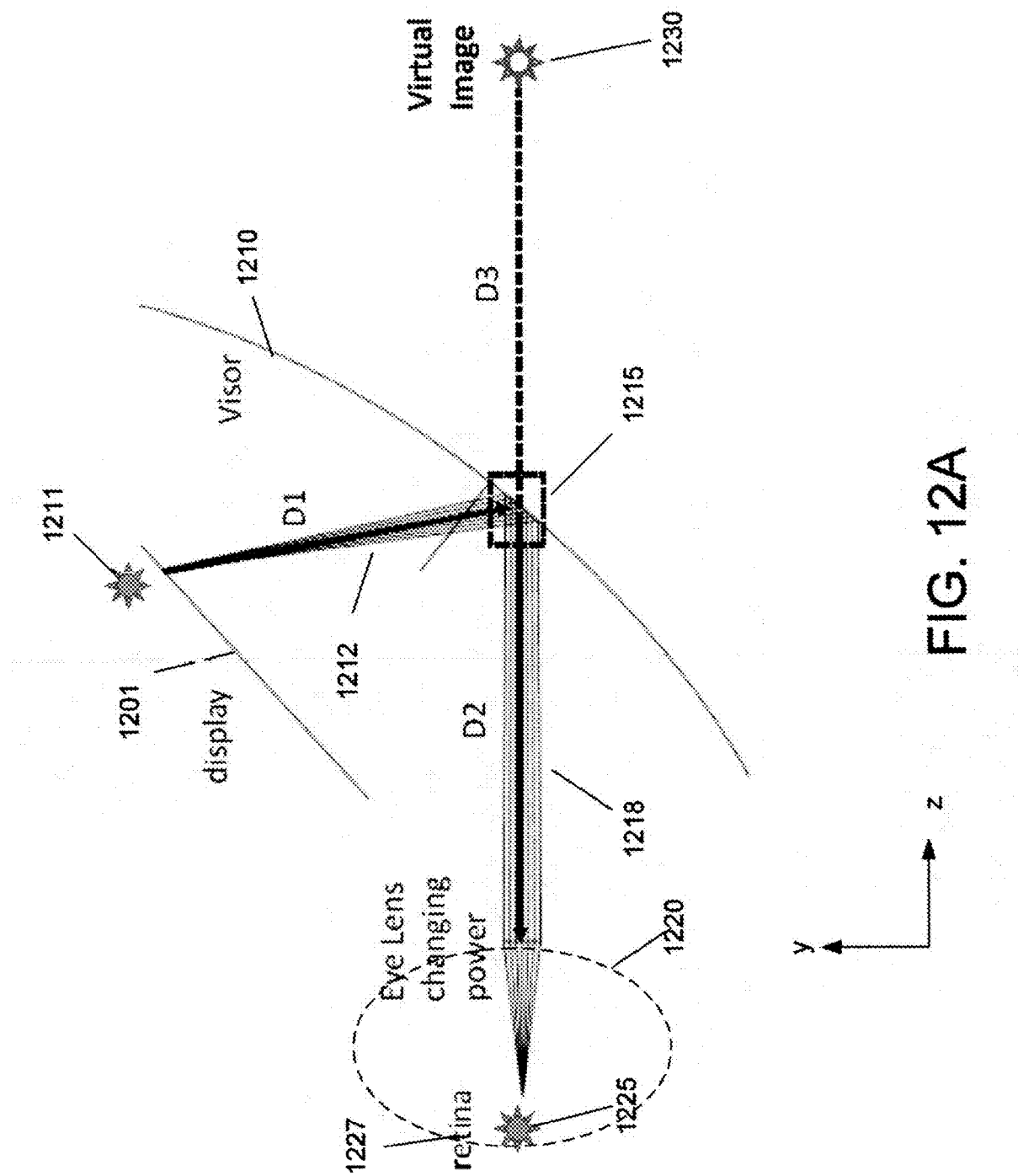
FIGS. 12A and 12B show examples of an optical diagram of an off-axis augmented reality vision system.

FIG. 12A shows one example of an optical diagram of an off-axis augmented reality vision system. As shown in FIG. 12A, in one implementation, the optical vision system 1200 includes at least one image source 1201 and an optical element 1210 arranged for viewing by an eye 1220 of a user. The image source 1201 emits light. The optical element 1210 includes a concave optical surface that reflects light. The optical surface also has an optical power, for example, specified by a prescription defining the curvature of the surface. In one implementation, the image source 1201 is positioned to emit light that is outside of the FOV of the user (i.e., the user does not directly view the image source 1201). The optical element 1210 is positioned in relation to the image source 1201 such that the concave optical surface of the optical element 1210 reflects the light emitted by the image source 1201. The image source 1201 and the optical element 1210 are further positioned at a relative angle to each other (and the approximated position of an eye of a user intended to wear the HMD), such that light from the image source is reflected by the optical surface of the optical element into a corresponding eye of a user to provide an image on the retina that is superimposed within the FOV of the user. In one implementation, the optical element 1210 may be an optical combiner, semi-reflective surface, half-silvered mirror, and/or the like in which the optical surface of the optical element 1210 may partially reflect light from the image source in addition to allowing light to pass through the optical surface from an exterior light source to combine the image light and exterior light in the FOV of the user.

In one implementation, the optical surface of the optical element 1210 facing the image source 1201 and eye 1220 is concave. The optical surface is curved to provide a specified optical power for the optical system 1200 thereby magnifying the image from the source within the user's FOV and providing a wide FOV (e.g., over a similarly angled flat surface). In one implementation, the optical surface is tilted with respect to image source 1210 and viewer. However, tilting an optical power surface applies different optical power in the vertical direction (x dimension) and the horizontal direction (y dimension) of the viewer resulting in an off-axis system.

In one embodiment, optical element 1210 may be implemented as a visor, such as with two eye image regions, each corresponding to one of the eyes of a user. The image source 1201 may be implemented by a display, which may present any type of desired digital content. The image presented by the display may, in one implementation, be modelled as millions of point sources. In this example, an image 1211 is provided by the display. As shown in FIG. 12, the light 1212 emitted from points on the display corresponding to image 1211 travel a distance of D1 prior to arriving at a local optical area 1215 on the visor (e.g., indicated back rectangle). Part 1218 of the emitted light 1212 is reflected toward the eye 1220 of the user. The reflected light 1218 travels a distance of D2 prior to hitting the eye lens 1221. The optical muscles of the eye change the optical power of the eye lens 1221 to refocus the light and form a corresponding point image 1225 on the retina 1227. As a result, the user sees or perceives a virtual image 1230 of that point at a distance D3 from the visor location 1215. The total distance of the virtual image or the depth of focus from the human eye is the sum of D3 and D2.

Figure 12B:
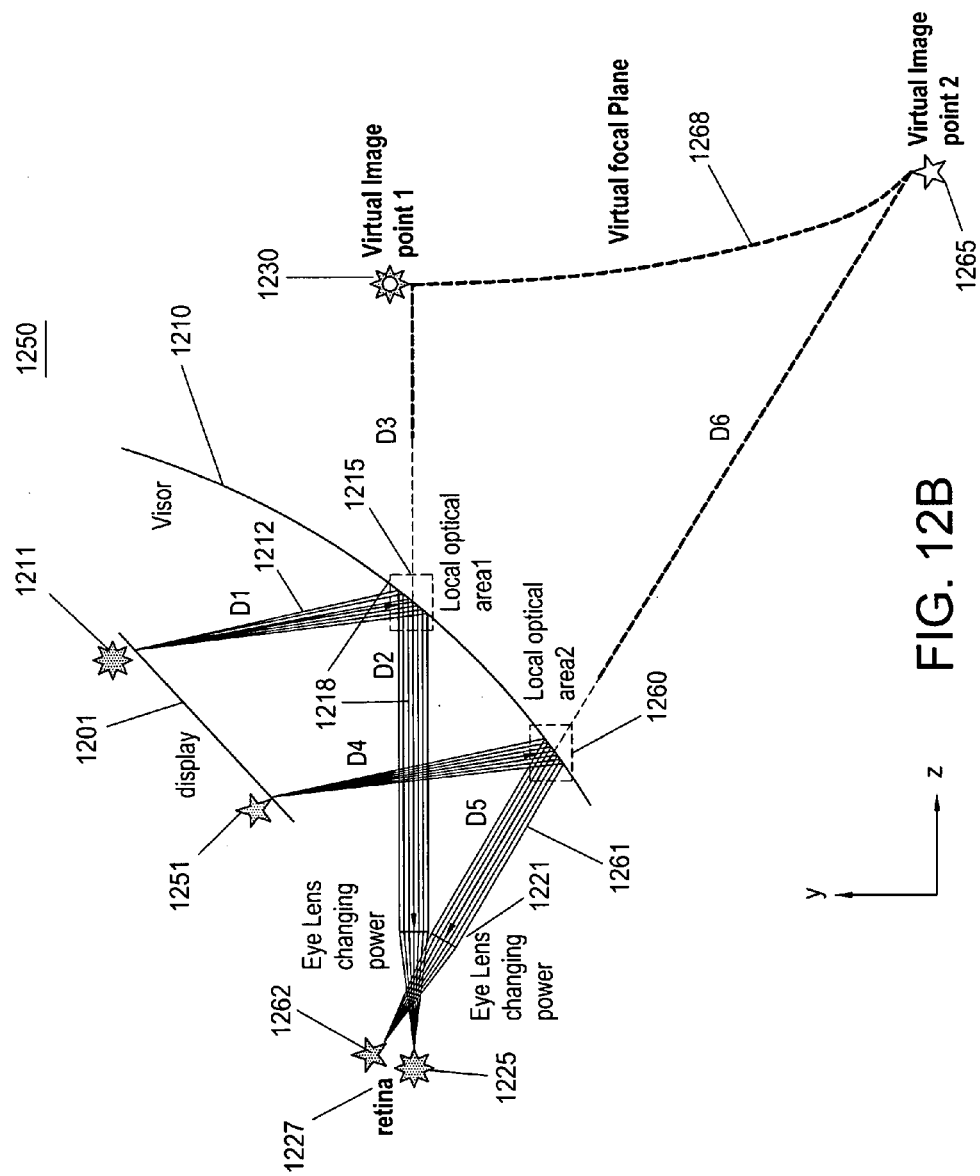
Figure 13:
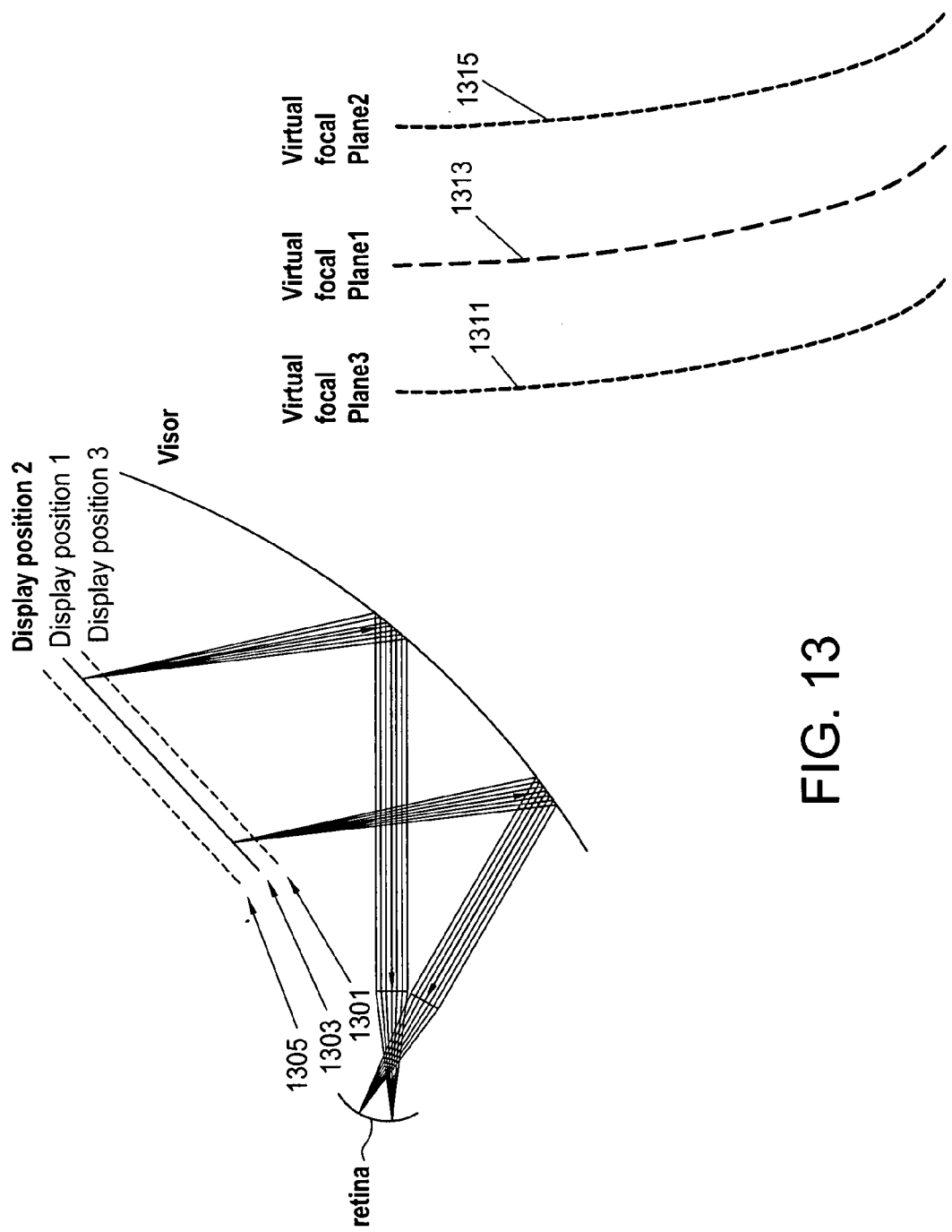
FIG. 13 shows an example of the focal planes in relation to light source position.

FIG. 12B shows another example 1250 of the vision system 1200. As the eyes of a user, rotate to view different points provided by the display, the optical path of the viewer changes. As also shown in FIG. 13, two different optical light paths associated with two different points, 1211 and 1251 on the display are illustrated. When viewing point 1211 of the display (e.g., depicting a sun image), light emitted 1212 travels distance D1 to local optical area 1215 on the visor 1201 where part of the light 1218 is reflected distance D2 prior to arriving at the eye lens to form a point image 1225 on the retina 1227. As described above, a user views and perceives a virtual image point 1230 at a distance D3+D2 away from the eyes of the user. When the user then views point 1215 of the display (e.g., represented as star sign), the eye rotates and to place the eye lens at a different location. In this case, light 1258 travels from point 1251 distance D4 prior to arriving at local optical area 1260 on the visor. A portion of the light 1261 is reflected towards the view traveling a distance D5 until reaching the eye lens at a new location to form a new point image 1262 on the retina 1127. The user views a virtual image point 1265 at a combined distance D6+D5 from the eye of the viewer. Because of the off-axis layout of the vision system 1200, the two virtual image points 1230 and 1265 are at different distances from the eye of the user. As a result, the virtual "focal plane" (e.g., represented by a black dash line) 1268 associated with the image provided by the display 1210, is slanted away from the eye, putting the top of the field of view closer to the user and the bottom further away.

FIG. 13 shows one example 1300 of the focal planes as a relation to light source position. As shown in FIG. 13, a light source 1201 (e.g., a panel display) may be place in one of three positions 1301, 1303, and 1305. As shown, the orientation of the display relative to the optical element 1210 (e.g., a visor of an HMD) is substantially in the same in each of the positions 1301, 1303, 1305; however, as the distance from the display changes, the distance the light travels to the display changes. As a result, the distance of the associated virtual focal plane changes. For example, virtual focal plane 1311 corresponds to position 1301 of the display, virtual focal plane 1313 corresponds to position 1303 of the display, and a virtual focal plane 1315 corresponds to position 1305 of the display. Therefore, moving the display between positions 1301 and 1305 introduces volumetric focal plane region bounded by a NP (e.g., 1311) and a FP (e.g., 1315). In one embodiment, the display 1201 is coupled with at least one electro mechanical mechanism 1330 to move the display between at least two predetermined positions corresponding to at least the NP and the FP. For example, an interface of a processing device 1335 is connected to the mechanism 1330 (e.g., a controller or driver of an electrical motor, magnet, or spring) to control the position of the display as specified by the processing device.

Figure 14:
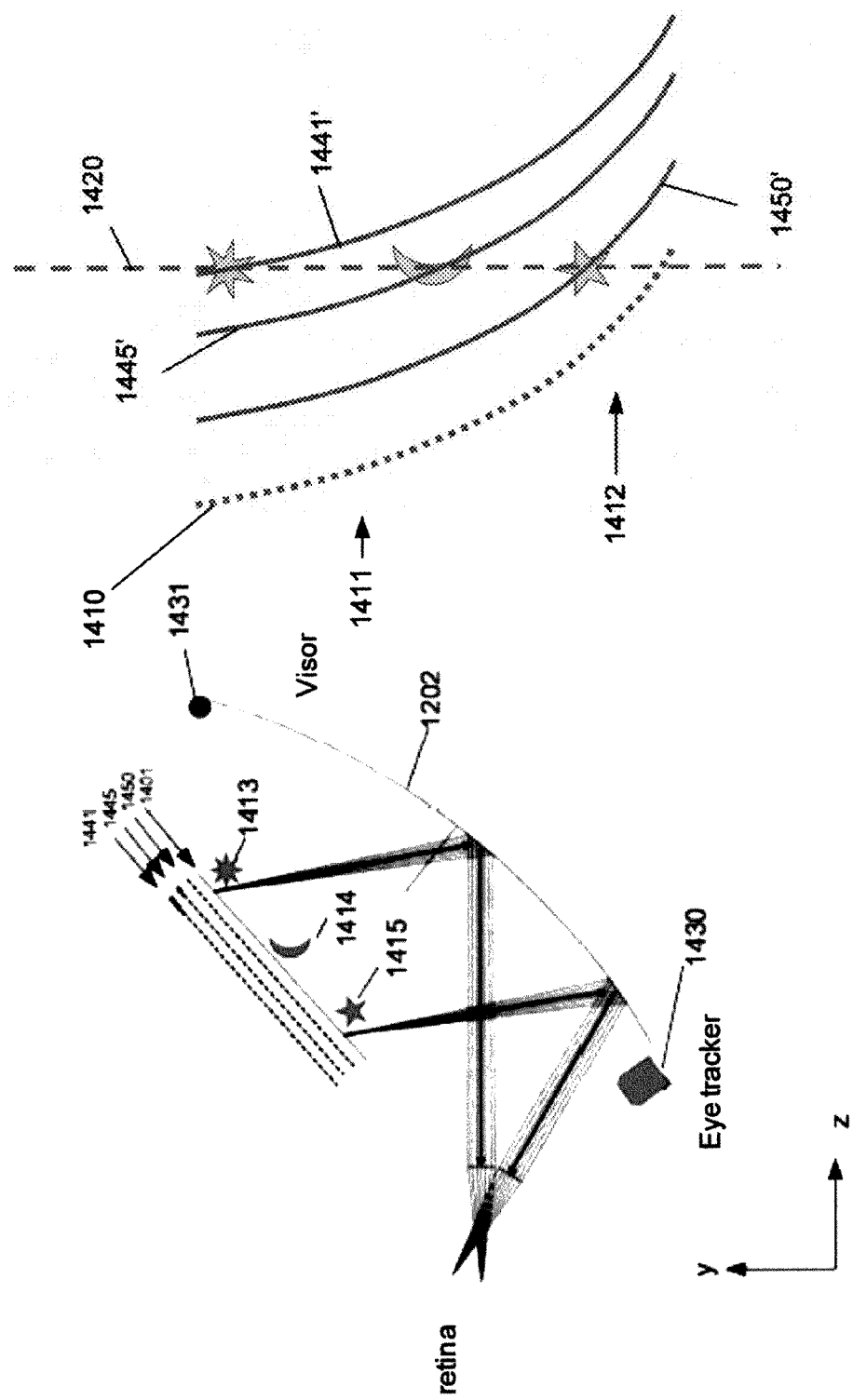
FIG. 14 shows an example of display movement used to the target a virtual focal plane.

FIG. 14 shows another example 1400 of different display movements used to move digital content to different FOV to the target a virtual focal plane. As shown in FIG. 1400, for a display at the nominal position 1401, a virtual focal plane 1410 is created. As previously pointed out, the plane 1410 is slanted due to the curvature of the focal plane created by the off-axis optical element 1210. For example, a top portion 1411 of virtual focal plane 1410 is closer to the user of the vision system than a bottom portion 1412. In an optical system utilizing an off-axis optical element (e.g., 1201), if an image presented by the vision system includes a sun image 1413, a moon image 1414, and a star image 1415 on target virtual focal plane 1420, the display must be moved to bring the image (e.g., sun, moon, or star) on which the user is focusing into focus. For example, if the viewer is looking at the sun 1413 on target focal plane 1420, the display is moved to the position 1441 corresponding to the FP 1441'. If the viewer is looking at the moon 1414 on target virtual focal plane 1420, the display is moved to an intermediate position 1445 corresponding to the intermediate virtual focal plane 1445'. If the viewer is looking at the star 1415 on target focal plane 1420, the display is moved to the position 1450 corresponding to another intermediate virtual focal plane 1450'. In this example, the vision system determines what virtual object user is looking at based on feedback from an eye tracker system (e.g., IR camera 1430, IR emitter 1431, and processing device (not shown)). The eye tracker system determines the fixation of the user (e.g., the FC) and determines the distance to move the display to focus that portion of the image in the target plane 1420.

Figure 15:
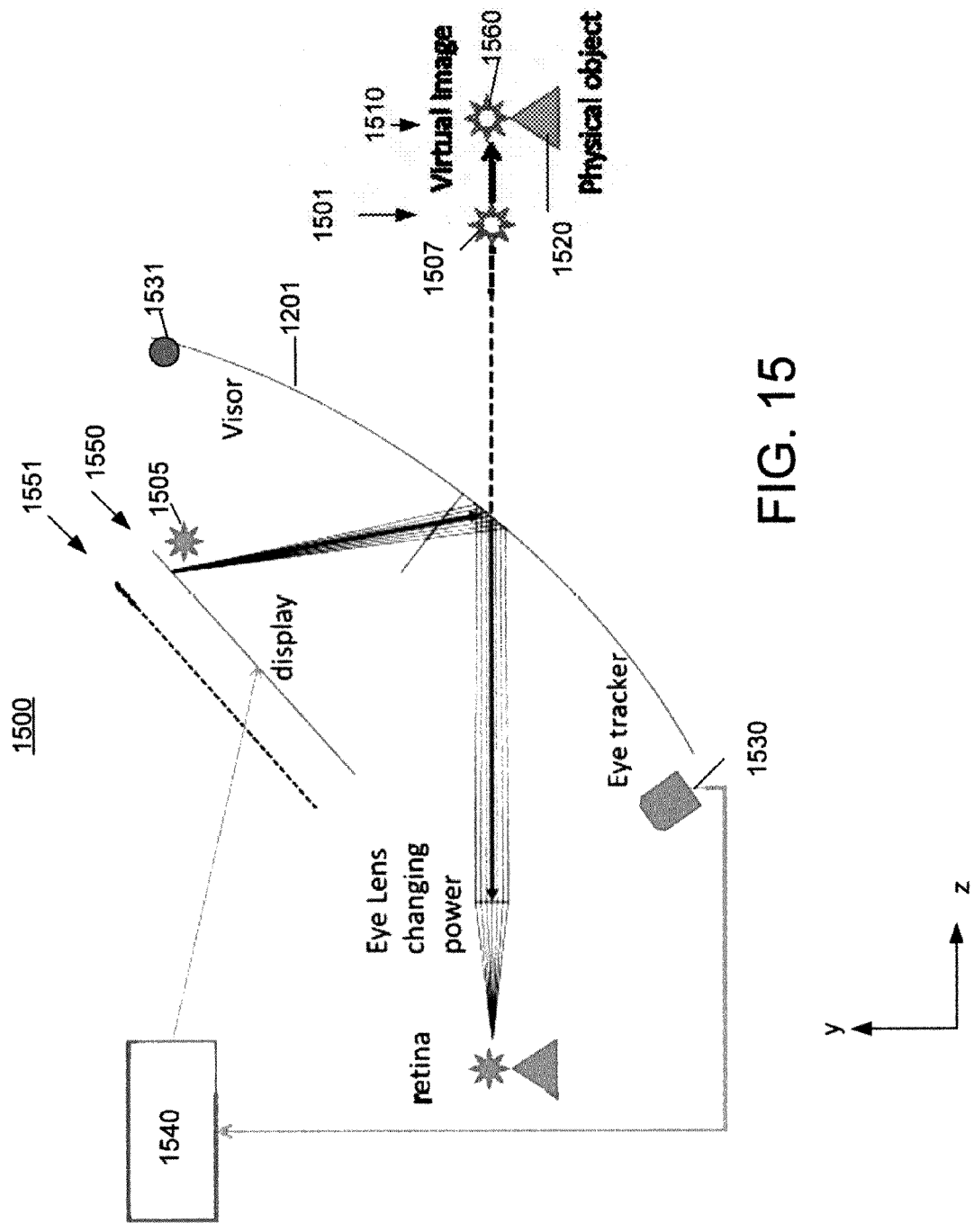
FIGS. 15 and 16 show examples of a vision system providing display movement to adjust the perceived position of digital content for different FOVs.

FIG. 15 shows another example 1500 of a vision system providing different display movements to adjust the perceived position of digital content for different FOVs. In this example, feedback through the eye tracker system adjusts the perceived depth 1501 of digital content (e.g., a sun 1505) in a virtual image 1507 to match the location 1510 of a physical real world object 1520 (e.g., a triangle) the user of the vision system is looking at. In this example, the eye tracker system includes an IR camera 1530, IR emitter 1531, and processing device 1540. With the assistance of the eye tracking system, the vision system determines which narrow FOV angle the user is fixated upon and determines the physical target location corresponding to the distance the human is looking at. In one example, a feedback loop is used to move the display from a nominal position 1550 a specific calibrated amount to a new position 1551 to project the digital content (e.g., a sun) as a virtual image 1560, of the same narrow FOV angle, to a depth corresponding to the location 1510 of the physical target 1520.

Figure 16:
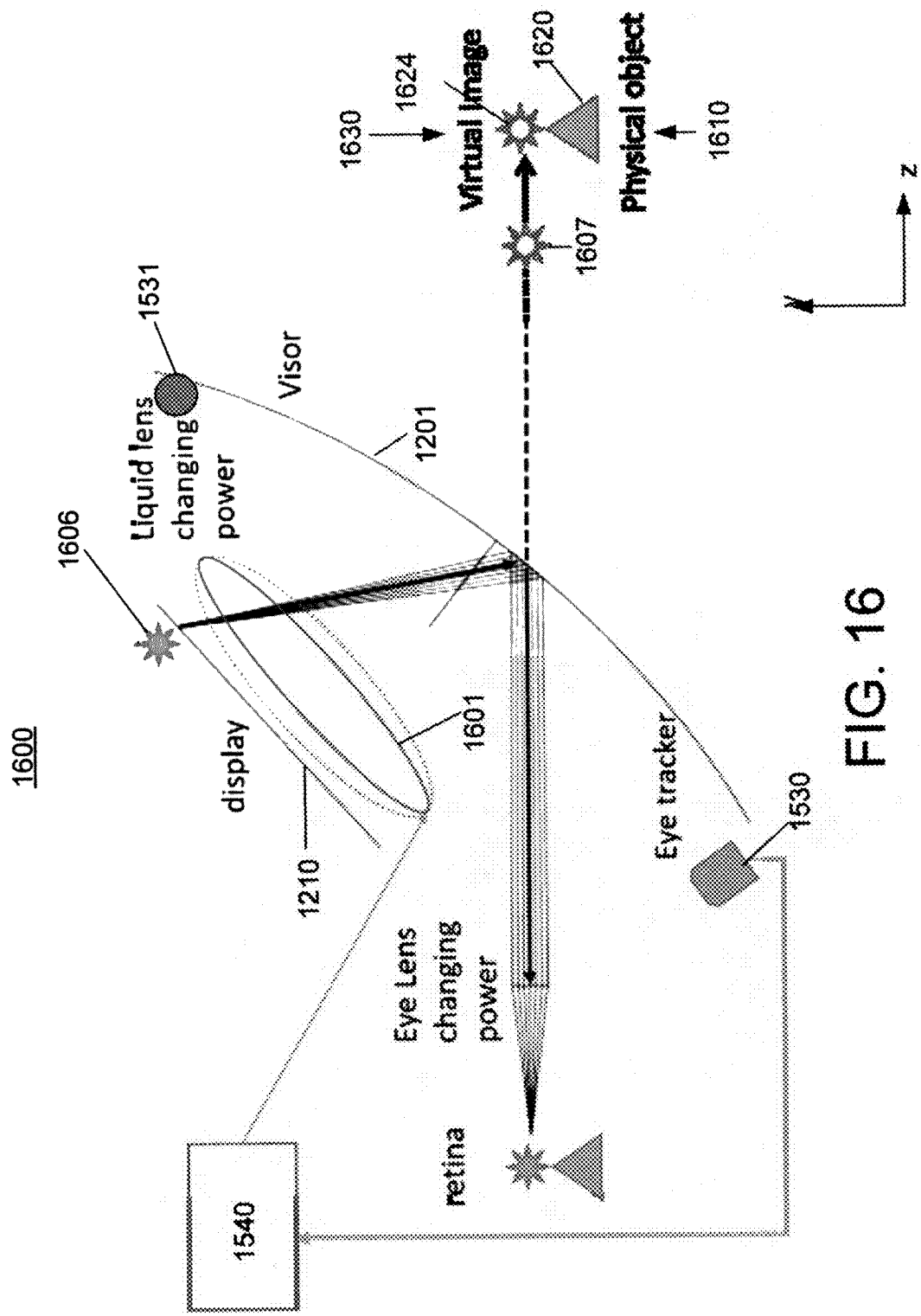

FIG. 16 shows another example 1600, similar to that shown in FIG. 15. In this example, a variable power lens 1601 is used to change the total optical power between the light source 1210 and the human eye to change the perceived depth of an image 1606 (e.g., a sun) in a virtual image, 1607 to coincide with the location 1610 of a real world physical object 1620 (e.g., a triangle) that the user is looking at. With the assistance of the eye tracking system, the vision system determines which narrow FOV angle the user is fixated upon and determines the physical target corresponding to the distance the user is looking at. In one example, a feedback loop is used to change the shape of the liquid lens 1601 to project the digital content (e.g., a sun) as a virtual image 1624, of the same narrow FOV angle, to a depth 1630 corresponding to the location 1610 of the physical target (e.g., the triangle).

As described above, the techniques described herein for a vision system can be implemented using digital electronic circuitry, or in computer hardware, firmware, software, or in combinations of them. The techniques can be implemented as a computer program product, i.e., a computer program tangibly embodied in a non-transitory information carrier, for example, in a machine-readable storage device, in machine-readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes, such as, for example, 400, 700, 1000, and others can be performed by one or more programmable processing devices or processors executing one or more computer programs to perform the functions of the techniques described above by operating on input digital data and generating a corresponding output (e.g., to control the luminance to intensity of one or more displays or adjust the focal plane of the vision system and render depth dependent disparity and blur). Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as, internal hard disks or removable disks; magneto-optical disks; and CD-ROM and DVD-ROM disks. The processor and the memory can be supplemented by, or incorporated in special purpose logic circuitry.

The vision system may include various other components including various optic devices and frames or other structure for positioning or mounting the vision system on a user allowing a user to wear the vision system while providing a comfortable viewing experience for user. The vision system may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs. Many examples of various devices that may be used to provide such components are described in further detail in previously incorporated U.S. application Ser. No. 14/147,199.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A vision system comprising:
   a first display;
   a second display;
   an optical element arranged at a first distance from the first display and at a second distance from the second display to project light emitted from the first display in a first focal plane and to project light emitted from the second display in a second focal plane; and
   a processing device configured to control the relative intensity (RI) of one or more pixels of the first display and the second display to generate a perceived three dimensional light field.

2. The system of claim 1 wherein the first focal plane is a far plane (FP) of focus to a viewer of the system and the second focal plane is a near plane (NP) of focus to a viewer of the system.

3. The system of claim 2 wherein RI=(INP−IFP)/(INP+IFP) where RI is the relative intensity calculated at each pixel of an image and normalized, INP is the intensity of the image provided in the NP, IFP is the intensity of the image provided in the FP.

4. The system of claim 1 wherein the first display is a liquid crystal display and the second display is a transparent organic light emitting diode display and the optical element has a single focus.

5. The system of claim 1 further comprising a third display arranged at a third distance from the optical element that is closer than the first display and farther than the second display, the third display arranged to project an image in a mid-plane of focus of the viewer of the system.

6. A vision system comprising:
   a display including at least a first portion and a second portion;
   a multifocal optical element including a first focus arranged to project light emitted from the first portion of the display in a first focal plane and a second focus arranged to project light emitted from the second portion of the display in a second focal plane; and
   a processing device configured to control the relative intensity (RI) of one or more pixels of the first portion of the display and the second portion of the display to generate a perceptual three dimensional light field.

7. The system of claim 6 wherein the first focal plane is a far plane (FP) of focus to a viewer of the system and the second focal plane is a near plane (NP) of focus to a viewer of the system.

8. The system claim 7 wherein RI=(INP−IFP)/(INP+IFP) where RI is the relative intensity calculated at each pixel of an image and normalized, INP is the intensity of the image provided in the NP, and IFP is the intensity of the image provided in the FP.

9. The system of claim 6 wherein the display includes a third portion and the multifocal optical element include a third focus arranged to project an image from the third portion in a mid-plane of focus of the viewer of the system.

* * * * *